United States Patent
Fretz et al.

(10) Patent No.: US 11,392,414 B2
(45) Date of Patent: Jul. 19, 2022

(54) COOPERATION-BASED NODE MANAGEMENT PROTOCOL

(71) Applicant: Target Brands, Inc., Minneapolis, MN (US)

(72) Inventors: Christopher Fretz, Harleysville, PA (US); Hrishikesh V. Prabhune, Sunnyvale, CA (US); Luis F. Stevens, San Jose, CA (US)

(73) Assignee: Target Brands, Inc., Minneapolis, MN (US)

( * ) Notice: Subject to any disclaimer, the term of this patent is extended or adjusted under 35 U.S.C. 154(b) by 138 days.

(21) Appl. No.: 16/593,766

(22) Filed: Oct. 4, 2019

(65) Prior Publication Data

US 2021/0103475 A1 Apr. 8, 2021

(51) Int. Cl.
    *G06F 9/46* (2006.01)
    *G06F 9/50* (2006.01)
    *G06F 9/48* (2006.01)

(52) U.S. Cl.
    CPC ............ *G06F 9/5027* (2013.01); *G06F 9/485* (2013.01); *G06F 9/4881* (2013.01)

(58) Field of Classification Search
    CPC ....... G06F 9/5027; G06F 9/485; G06F 9/4881
    See application file for complete search history.

(56) References Cited

U.S. PATENT DOCUMENTS

| | | | | |
|---|---|---|---|---|
| 2002/0059309 | A1* | 5/2002 | Loy | G06F 16/148 |
| 2003/0217099 | A1* | 11/2003 | Bobde | H04L 67/306 |
| | | | | 709/202 |
| 2005/0114754 | A1 | 5/2005 | Miller et al. | |
| 2005/0114854 | A1 | 5/2005 | Padisetty et al. | |
| 2007/0255821 | A1* | 11/2007 | Ge | G06Q 10/00 |
| | | | | 709/224 |
| 2012/0137375 | A1* | 5/2012 | Ramachandran | G06F 21/6218 |
| | | | | 726/28 |
| 2012/0179743 | A1* | 7/2012 | Sullivan | G06F 16/95 |
| | | | | 709/203 |
| 2012/0179744 | A1* | 7/2012 | Sullivan | H04L 67/02 |
| | | | | 709/203 |
| 2014/0006498 | A1* | 1/2014 | Liu | G06F 15/16 |
| | | | | 709/204 |
| 2017/0317935 | A1* | 11/2017 | Murthy | G06Q 20/32 |

OTHER PUBLICATIONS

Anonymous, "Queuing tasks with Redis," Rapid7 Blog [online]. Retrieved from the Internet: <URL: https://blog.rapid7.com/2016/05/04/queuing-tasks-with-redis/>, 10 pages, May 4, 2016.

(Continued)

*Primary Examiner* — Camquy Truong
(74) *Attorney, Agent, or Firm* — Merchant & Gould P.C.

(57) ABSTRACT

A node management protocol is disclosed herein. The protocol can be used for task distribution in multi-node systems. The node management protocol can implement a cooperation-based task distribution algorithm that does not rely on consensus. When a task is ingested into a cluster of nodes, the nodes can compete to handle the task. A transport layer helps coordinate among nodes and facilitates the handling of work. A session expiry protocol handles node failures with the remaining nodes reassigning work.

17 Claims, 20 Drawing Sheets

(56) References Cited

OTHER PUBLICATIONS

Chase, "Distributed Systems, Failures, and Consensus," Duke University [online]. Retrieved from the Internet: <URL: https://www2.cs.duke.edu/courses/fall07/cps212/consensus.pdf>, 79 pages.
Saini, "ConsensusPedia: An Encyclopedia of 30+ Consensus Algorithms," Hackernoon [online]. Retrieved from the Internet: <URL: https://hackernoon.com/consensuspedia-an-encyclopedia-of-29-consensus-algorithms-e9c4b4b7d08f>, 62 pgs., Jun. 26, 2018.
Anonymous, "Can't we all just agree?" The Morning Paper Retrieved from the Internet: <URL:https://blog.acolyer.org/2015/03/01/cant-we-all-just-agree/>, published Mar. 1, 2015, 4 pages.

* cited by examiner

COOPERATION-BASED NODE MANAGEMENT PROTOCOL

BACKGROUND

In distributed computation platforms, the problem of deciding when and where to execute a task is a complex issue. Many platforms choose a consensus based approach that requires either election of a master or a quorum for making decisions. However consensus based approaches can be complex and incur significant overhead, which can limit their usefulness in applications with high performance requirements.

SUMMARY

Generally, the present disclosure includes technology for managing node sessions in multi-node computing systems.

In one embodiment, a method for handling expiration of a session associated with processing threads is disclosed. The method comprises: detecting expiration of an expired session; upon detecting the expiration of the expired session, removing a session identifier associated with the expired session from an active set and adding the session identifier to an expired set; freeing one or more computing resources associated with the expired session; maintaining a running set associated with the expired session; maintaining a removal set associated with the expired session; determining whether the running set and removal set are empty; and upon determining the running set and removal set are empty, removing the session identifier associated with the expired session from the expired set, thereby handling expiration of the expired session.

In a second embodiment, a method for handling expiration of a current session belonging to a cluster of sessions is disclosed. The method comprises: with the current session: detecting the expiration of the current session; terminating all tasks associated with the current session; reentering the current session into the cluster of sessions as a new session.

In a third embodiment, a system for handling expiration of a session is disclosed. The system comprises: a non-transitory computer-readable medium having instruction stored thereon that, when executed by the one or more processors, cause the one or more processors to: maintain a cluster of sessions, wherein each session of the cluster of sessions is configured to execute one or more tasks; maintain a node manager configured to manage the execution of at least one session of the cluster of sessions; maintain an active set wherein the active set includes a grouping of one or more sessions that are currently being managed by the node manager; and maintain an expired set, wherein the expired set includes a grouping of one or more sessions that are no longer being managed by the node manager.

DETAILED DESCRIPTION

The present disclosure relates generally to a node management protocol. Such a protocol can advantageously provide a lightweight and easily-understandable task distribution algorithm for multi-node systems. The technology herein can be especially useful compared to traditional techniques. Traditional platforms often use a consensus-based approach, and such approaches can result in significant overhead and difficult failure recovery protocols. By contrast, technology described herein can be used to implement a cooperation-based task distribution algorithm that does not require consensus. In a cooperation-based task distribution algorithm, when a task is ingested into a cluster of nodes, the nodes compete to handle the task. A transport layer helps coordinate among nodes and facilitates the handling of work. Disclosed node management protocols can include protocols that handle cluster join events, cluster exit events, cluster info events, cluster add events, cluster update events, and cluster remove events. Session add events, session update events, session remove events, and session expiry events can also be handled.

In addition, in traditional consensus-based approaches, whenever a wait command is issued, the whole cluster waits for the cluster to reach a consensus before proceeding. This can cause unnecessary delays and inefficiencies in executing tasks. By contrast, in examples of the cooperation-based approach described herein, individual nodes can execute wait commands locally without delaying other nodes of the cluster. In examples herein, the cooperation based task management algorithm can be configured to only require wait commands when a replica is present. Thus, a cooperation based approach can allow for more efficient execution of tasks.

One challenge in managing nodes is session expiration. Session expiration can have a variety of causes, such as node failure. A session expiration protocol can handle node failures by reassigning work to the remaining nodes. In examples herein, expiration of a session can be detected by another session or by the expired session itself. In many embodiments herein, expiration of a session is detected by tracking a session key. Upon detecting that a session key has expired, the session expiry protocol can be triggered. If the session detects its own expiration, the session terminates its currently running tasks and reenters the cluster as a new session. Alternatively, if a session detects the expiry of another session, then the expired session's session identifier is added to the expired set, all resources associated with the expired session are deleted, the running set and removal set are emptied and the tasks are reassigned to another session. The session's session identifier is removed from the active set and expired set.

Example Environment

Figure 1:
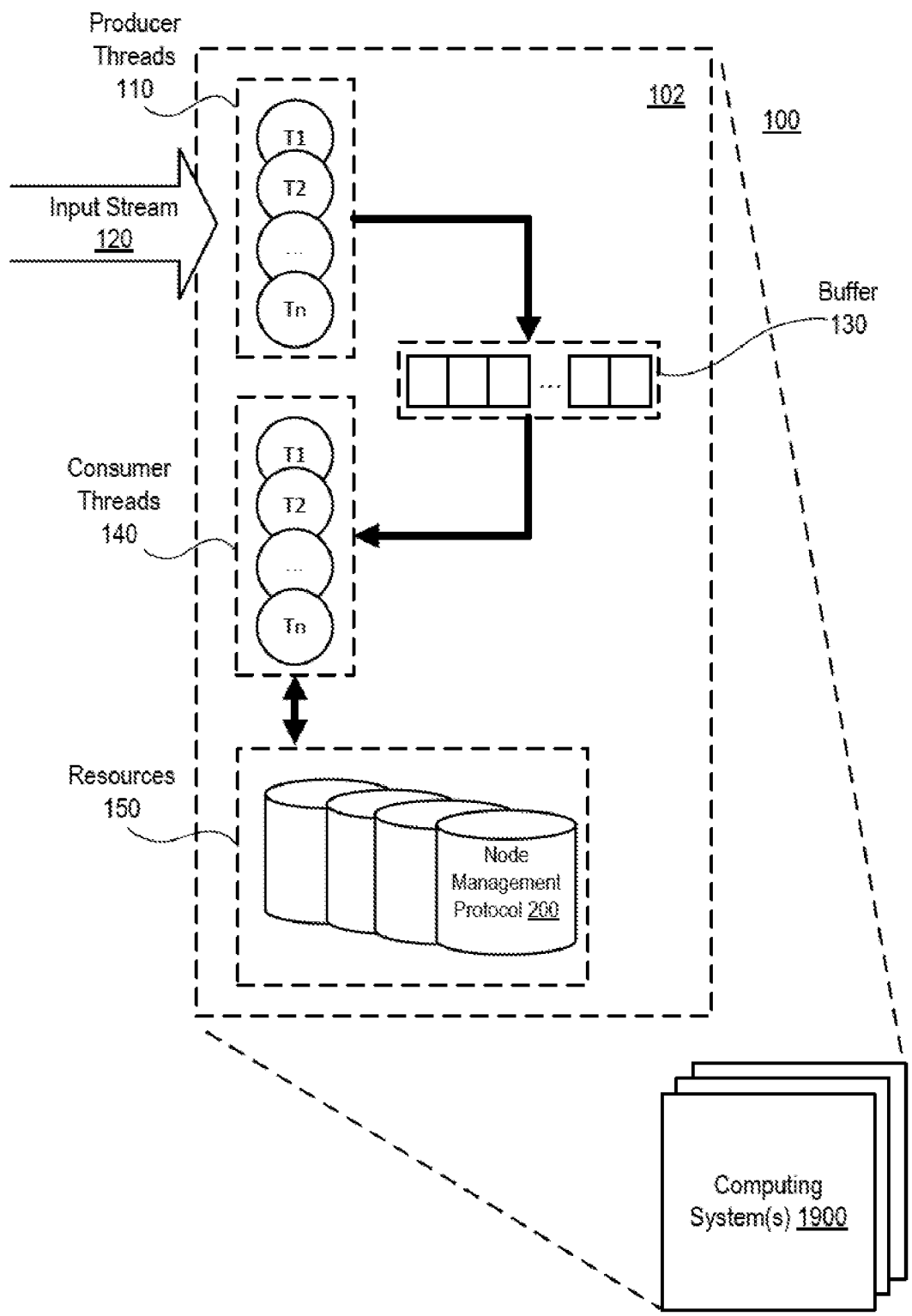
FIG. 1 illustrates an example computing environment that can benefit from use of technologies described herein.

FIG. 1 illustrates an example computing environment 100 that can benefit from use of technologies described herein. The computing environment 100 is provided by one or more computing systems 1900 (described in more detail in FIG. 19). In many examples, the one or more computing system 1900 are each one more physical or virtual computers (also referred to herein as nodes) having memory and one or more processors configured to execute instructions stored in the memory. The one or more computing systems 1900 can be configured for particular tasks. In an example, the computing systems 1900 can be high-performance computing systems having special-purpose hardware. The special-purpose hardware can include server- or workstation-grade CPUs (Central Processing Units) supporting high core counts, supporting large amounts of system memory, having large caches, having error correcting capabilities, other features, or combinations thereof. The special purpose hardware can include GPUs (Graphics Processing Units), AI (Artificial Intelligence) accelerating hardware (e.g., AI-focused processors or co-processors), error-correcting memory, other hardware, or combinations thereof. Further, one or more features can be provided as physical or virtual machines.

The computing environment 100 includes a producer-consumer workflow 102 having one or more producer threads 110 running on the one or more computing systems 1900 (e.g., in parallel). The producer threads 110 each produce data to a buffer 130 for consumption by one or more consumer threads 140. In the illustrated example, the producer threads 110 produce data based, in part, on an input stream 120. The consumer threads 140 run on the one or more computing systems (e.g., in parallel), remove data from the buffer 130, and process the data to produce a result. During this process, one more resources 150 can be used by the consumer threads 140. The one or more resources 150 can include one or more databases, data structures, or other resources. The resources 150 may, but need not, be provided by the one or more computing systems 1900 (e.g., one or more of the resources can be provided by a remote server or other computer). As illustrated, one of the resources 150 is a node management protocol 200 (described in more detail herein).

Increases in the amount of data in the input stream 120, the complexity of processing required by the consumer threads 140, and the demands by people or systems relying on the producer-consumer workflow 102, can likewise increase the importance of ensuring high performance of the system. While computing resources provided by the computing system 1900 can be scaled up or down from a pool of available computing resources (e.g., processing speed, memory, cache space, energy efficiency), the computing resources are finite, thus improvements to how the data structures and other aspects are processed can yield improvements to the functioning of the one or more computing systems 1900.

Techniques that can be common in traditional computing operations (e.g., blocking processing to wait for other programs to finish a task or otherwise synchronize processing) can be unsuitable in operating in such High-Performance Computing (HPC) applications. In addition, HPC systems often use many computing threads running on multiple different processors. As the number of threads increases, so too do difficulties in synchronizing processing and maximizing the use of resources. These difficulties are explained, in part, by what is known in the art as "Amdahl's Law", which predicts that theoretical speedups of parallel processing are limited by the ability of the underlying processes to be parallelized. Improvements to HPC technologies can generally relate to improving the ability of processes to be parallelized and run in HPC settings.

Example Node and Session Environment

Figure 2:
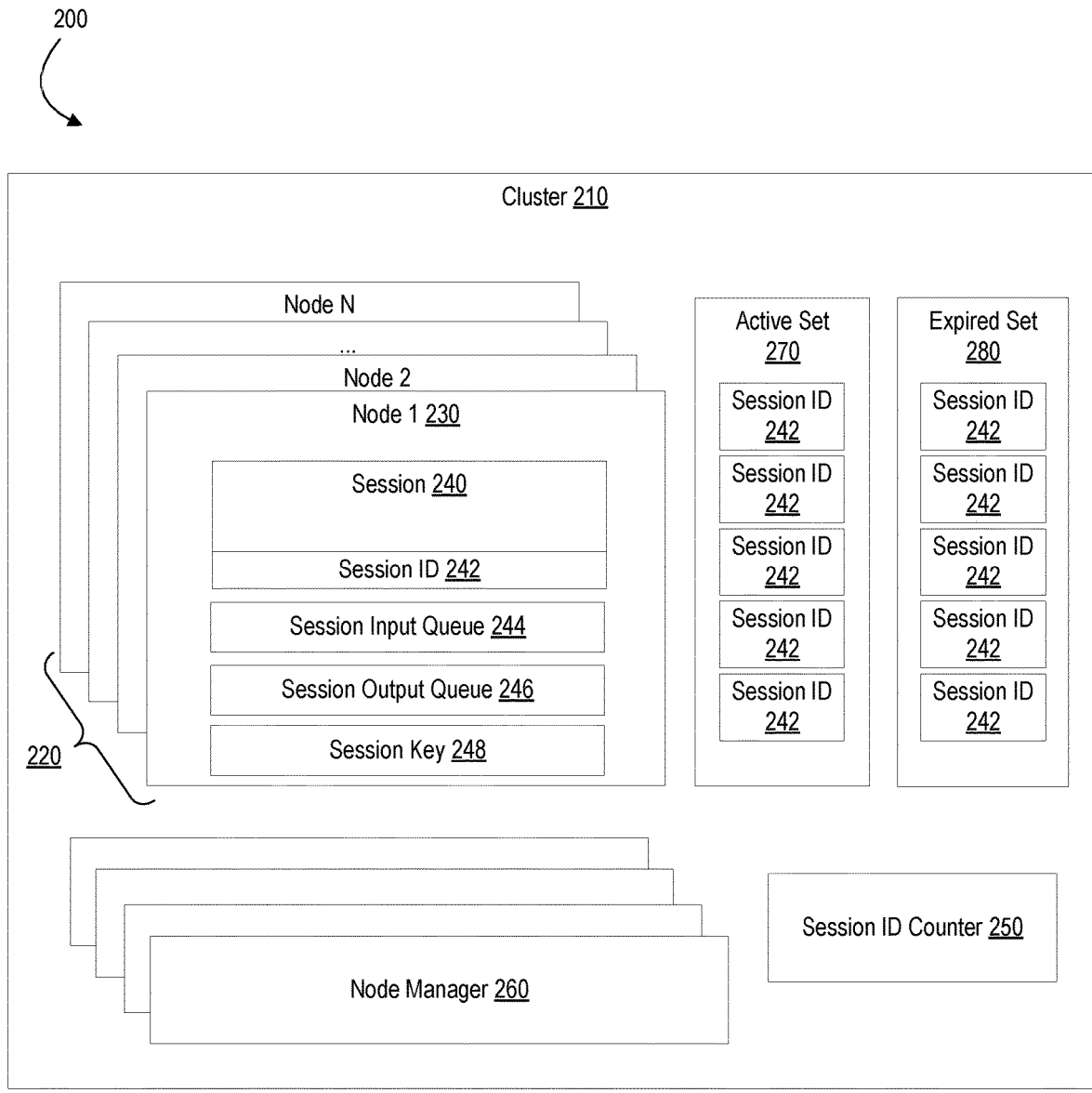
FIG. 2 illustrates an embodiment of a cluster of nodes executing a cooperation based node management protocol.

FIG. 2 illustrates an embodiment of a cluster 210 of nodes executing a cooperation based node management protocol 200. The cluster 210 can be part of a distributed computing system. A distributed computing system can be a computing model in which a computational problem is divided into multiple tasks and processed using multiple computing systems in order to improve efficiency and performance. The cluster 210 can be an aggregation of a set 220 of one or more nodes 230 that are configured to share an overall computing load. In the illustrated example, the multiple nodes within the cluster 210 are represented as Node 1 to Node N. Each node 230 of the set 220 can be a physical or virtual computing resource configured to perform tasks. The structure of a node 230 is described in more detail in relation to FIG. 19. Each node 230 can be configured to handle one or more sessions 240. A session 240 is the time during which a node 230 accepts input and manages one or more tasks. In a cooperative node management arrangement, all sessions 240 are equal and have no master. Sessions 240 run independently of each other and handle cluster-wide requests asynchronously. However, the sessions 240 handle session-specific requests serially. The sessions 240 can handle session-wide requests in no particular order by whichever session is available at the time. However, the session-specific requests are sent to a particular session 240 and are handled in the order it is received.

Each session 240 can be identified using a session identifier 242. A session identifier 242 can be a number or a series of alpha-numeric characters that are associated with the session 240 as a way of identifying the session. The session identifier 242 can be generated by a session identifier counter 250 that is incremented every time a new session 240 is created. Each node 230 can also include a session input queue 244 and a session output queue 246. The session input queue 244 keeps track of tasks that are assigned to the session 240 and waiting to be executed by the session 240. The session output queue 246 includes the tasks that have been completed by the session 240. The processed task outputs are tracked in the session output queue 246 before being sent to the cluster output queue 970. A session key 248 is associated with each session 240 and is used in determining if the session 240 has expired. The session key 248 is explained further in relation to FIG. 4.

In addition to the set 220 of one or more nodes 230, the cluster 210 can also include an active set 270 and an expired set 280 to keep track of the sessions 240 within the cluster 210. The active set 270 includes a grouping of one or more sessions 240 that are currently executing tasks. The expired set 280 includes a grouping of one or more sessions 240 that are no longer actively executing tasks. The grouping of sessions 240 can be organized as a queue, a stack, or in other ways. The sessions 240 are tracked using the session identifier 242. The cluster 210 also includes one or more node managers 260 that manage the execution of the one or more sessions within each of the nodes 230 in the cluster 210. Each node manager 260 can be associated with a node 230 and can be configured to manage the execution of a session 240 within the node 230. Managing the execution of a session 240 can include managing: the session input queue 244, the session output queue 246, tracking the session key 248, and updating the session key 248.

Figure 3:
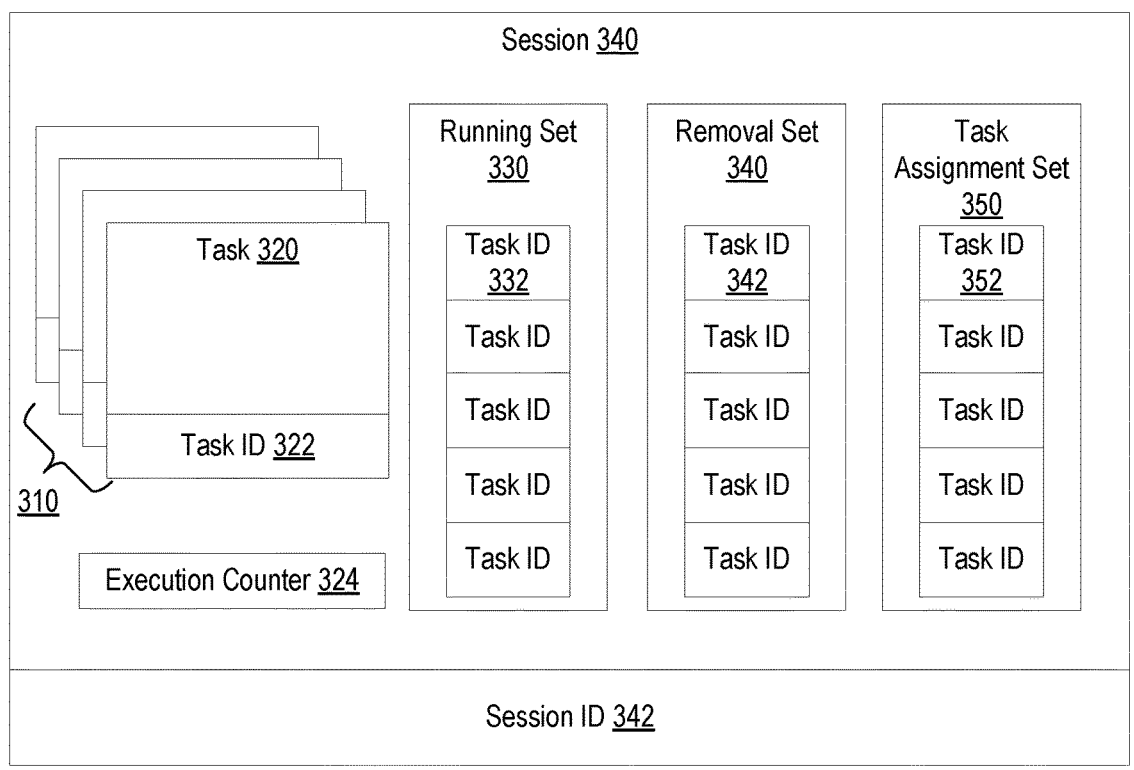
FIG. 3 illustrates an example embodiment of a session running on a node within a cluster.

The expiry of a session 240 within a multi-node cluster 210 can be detected by the session 240 itself or by another session 240 within the cluster 210. FIG. 3 details the cluster session expiry protocol 300 in the case of a session 240 detecting the expiration of another session 240 within the cluster 210.

FIG. 3 illustrates an example embodiment 300 of a session 240 running on a node 230 within a cluster 210. The session 240 can include one or more tasks 310 that are processed using one or more threads within the node 230. Each session 240 executing within a node 230 is configured to work through a list of tasks. In a node 230 that supports multi-thread processing, the session 240 can use one or more threads to execute each task 320. The list of tasks can be added to the session 240 from the session input queue 244 and are organized as a stack or queue. The node 230 can process the tasks using a queue, stack, or any other topology. A session identifier 242 is associated with each task 320. The task identifier 322 can be a number or a series of alphanumeric characters and is used to identify the task 320. The session 240 also includes a running set 330, a removal set 340 and a task assignment set 350. A running set 330 is a grouping of tasks that are currently being executed by the session. A removal set 340 is a grouping of tasks that are waiting to be removed from execution by the session. The grouping of tasks within the running set 330 and removal set 340 can be organized as a stack or queue. Each of the tasks within the running set 330 and removal set 340 are identified using the task identifier 332, 342. A task assignment set 350 tracks the list of tasks assigned to the session. The tasks in the task assignment set 350 are tracked using the task identifier 352. Each session 240 also includes an execution counter 324 that can be incremented in order to arrive at an execution identifier that is then assigned to each incoming request. The execution identifier provides a method of inferring the execution order of requests.

Figure 4:
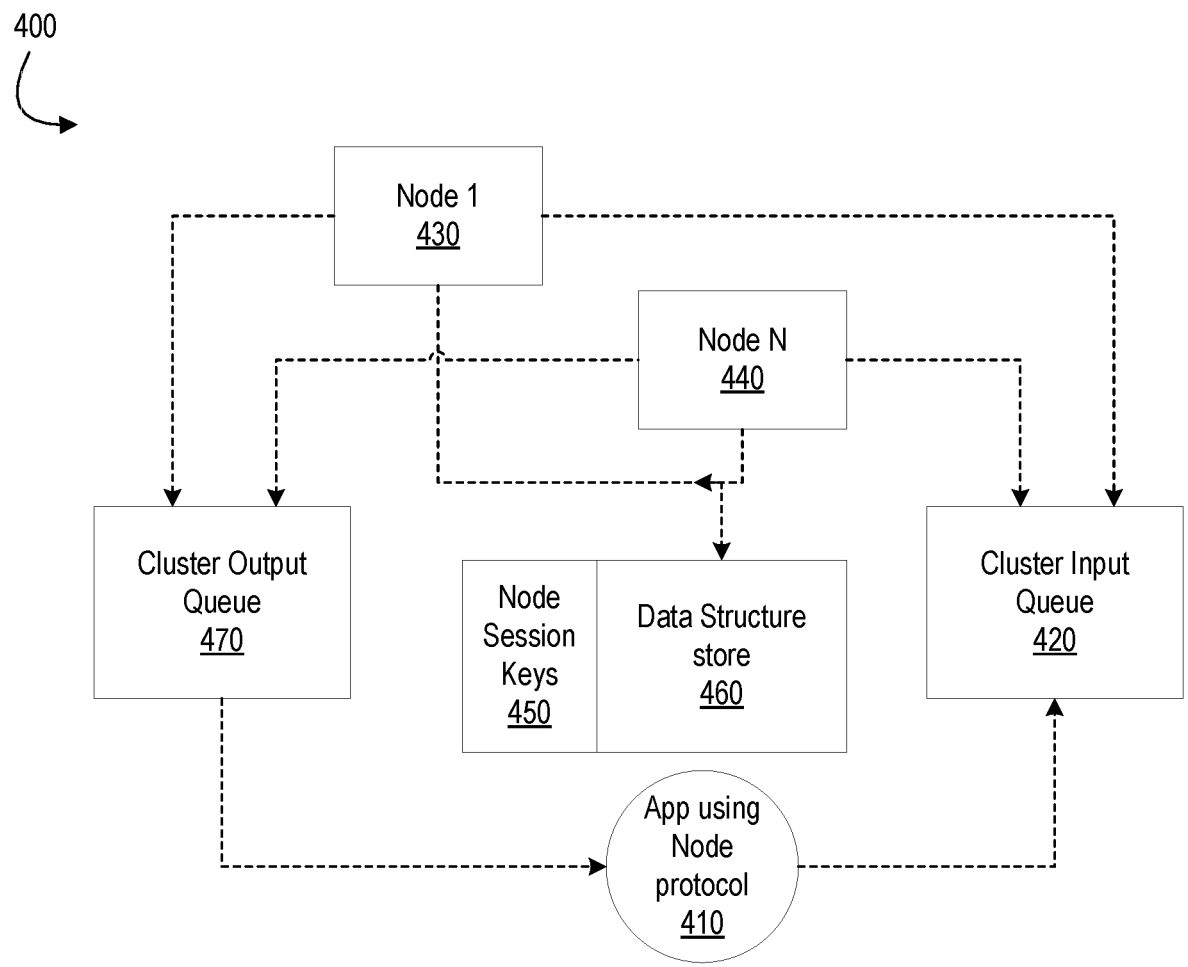
FIG. 4 illustrates a high-level example embodiment of a cooperation based node management protocol structure.

FIG. 4 illustrates a high-level example embodiment 400 of a cooperation based node management protocol structure. An application using the node protocol 410 issues tasks that to be processed by the cluster 210. The tasks are organized in a cluster input queue 420. The tasks can be retrieved using a first in first out topology or any other topology. The cluster 210 contains one or more nodes. In case of the non-limiting example embodiment 400, the cluster 210 includes Node 1 430 and Node N 440. The node sessions run independently of each other and handle cluster-wide requests asynchronously. However, sessions handle session specific requests serially. When a task is ingested into the cluster input queue 420, the nodes compete to handle the task. A transport layer, implemented using a data structure store 460, such as REDIS, can be used to coordinate among nodes and facilitate the handling of the work. The node session keys 450 are associated with each node and is updated continuously. As described in relation to FIG. 5, below, the session key is used in determining if a node session 240 has expired. Once the nodes 430, 440 finish completing the task, the resulting output is sent to the cluster output queue 470 to be presented to the application using the node protocol 410. The process is repeated as the application using the node protocol 410 sends tasks to the cluster input queue 420 and receives the resulting output from the cluster output queue 470.

Cluster Session Expiration Protocol Details

Figure 5A:
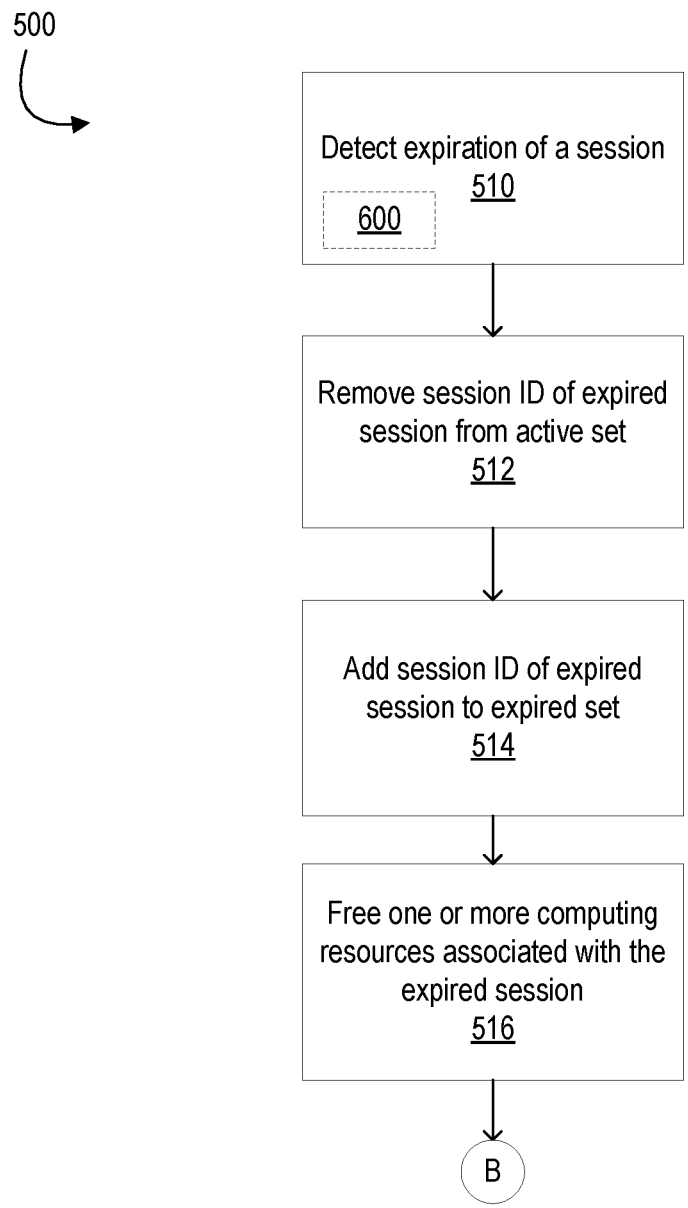
FIG. 5, which is made up of FIGS. 5A and 5B, illustrates an example method for a cluster session expiry protocol.
Figure 5B:
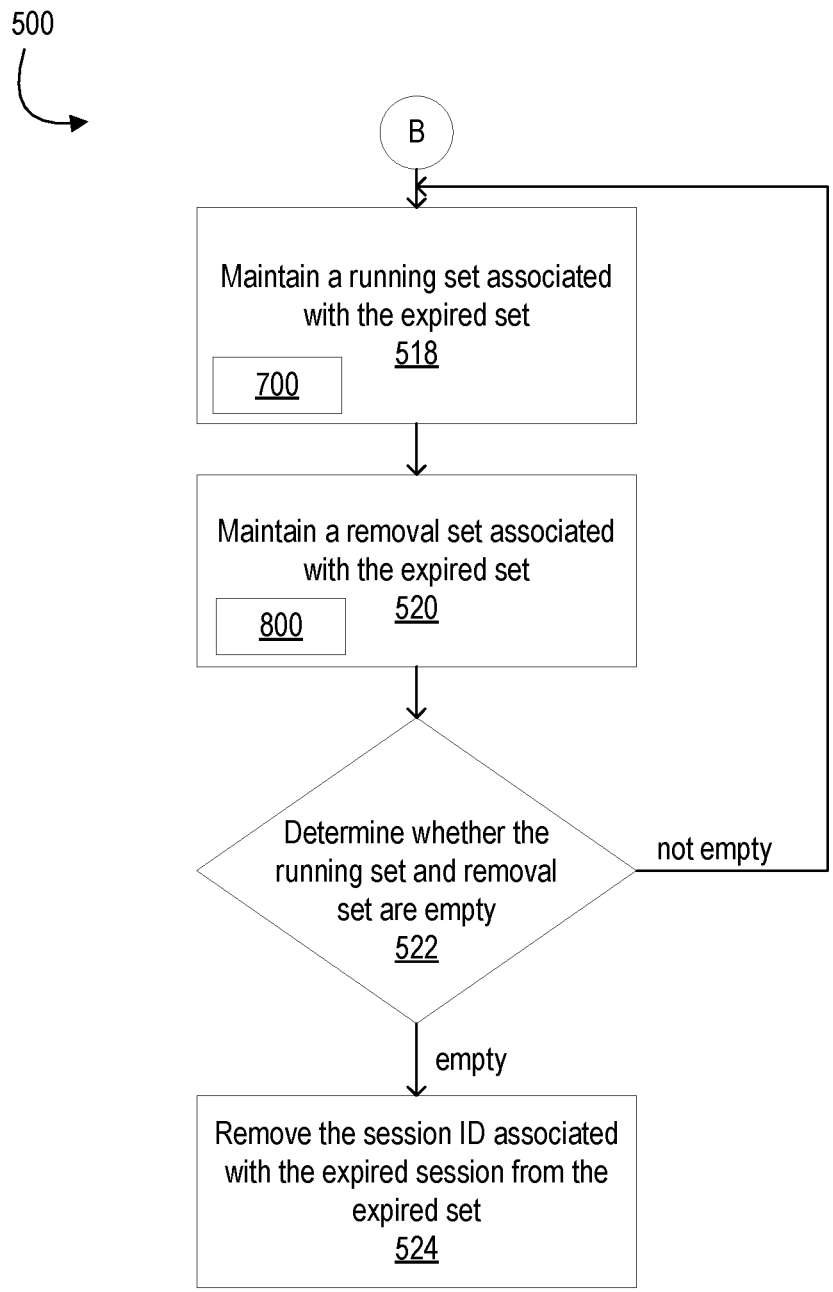

FIG. 5, which is made up of FIGS. 5A and 5B, illustrates an example process 500 for a cluster session expiry protocol. A cluster session expiry protocol can be a protocol for detecting and handling the expiration of a session 240. One reason for session expiration is node failure. When a node failure occurs, the session expiry protocol can handle the node failure by reassigning work that was being handled by the failed node 230 to other active nodes 230 within the cluster 210. A session 240 can detect its own expiration or another session 240 can detect the expiration.

In an example, the cluster session expiry protocol process 500 is initiated when the expiration of a session 240 is detected by another session 240. The process 500 can begin with operation 310. Operation 510 includes a session 240 detecting the expiration of another session 240. Detecting expiration of another session 240 can occur in any of a variety of ways. An example process for detecting expiration of another session 240 is described below in relation to FIG. 6.

Once a determination is made that a session key does not exist or is not active, the expiration of the session 240 is thereby detected and the flow of the process 500 of FIG. 5 can move to operation 512.

Operation 512 includes removing the session identifier 242 of the expired session 240 from the active set 270. In an example, removing the session identifier 242 can include deleting the session identifier 242 from the active set 270. In another example, removing a session identifier 242 can include calling a function associated with the active set 270 that removes the session identifier 242. Following operation 512, the flow of the process 500 can move to operation 514.

Operation 514 includes adding the session identifier 242 of the expired session 240 to the expired set 280. The expired set 280 includes a grouping of one or more sessions 240 that are no longer actively executing tasks. Following operation 514, the flow of the process 300 can move to operation 516.

Operation 516 includes freeing one or more resources associated with the expired session 240. Freeing the one or more resources can include deleting all resources associated with the expired session 240, with certain exceptions, reallocating the same resources to other sessions as needed. Resources can include computing resources like processor cycles and memory space. Exceptions to this deletion and reallocation process may include resources required to maintain execution of a running set and a removal set, such as running set 330 and removal set 340 of FIG. 3. As noted above, a running set corresponds to a grouping of tasks that are currently being executed by the session, while a removal set corresponds to a grouping of tasks that are waiting to be removed from execution by the session. Following operation 516, the flow can move to operation 518.

Operation 518 includes maintaining a running set and operation 520 includes maintaining a removal set associated with the expired session 240 until both the running set and removal set are empty. In addition, the process of maintaining the running set 330 is described in more detail in relation to FIG. 7, and the process of maintaining the removal set is described in more detail in relation to FIG. 8. While maintaining the running set 330 and the removal set 340, operation 522 can be performed.

Operation 522 includes determining whether the running set 330 and the removal set 340 of the expired session 240 are empty. If either the running set 330 or removal set 340 is not empty, then the sets 330, 340 continue to be maintained (e.g., operations 518, 520 continue). Upon determining that the running set 330 and removal set 340 are empty, the flow of the process can move to operation 524.

Operation 524 includes removing the session identifier 242 associated with the expired session 240 from the expired set 280.

Figure 6:
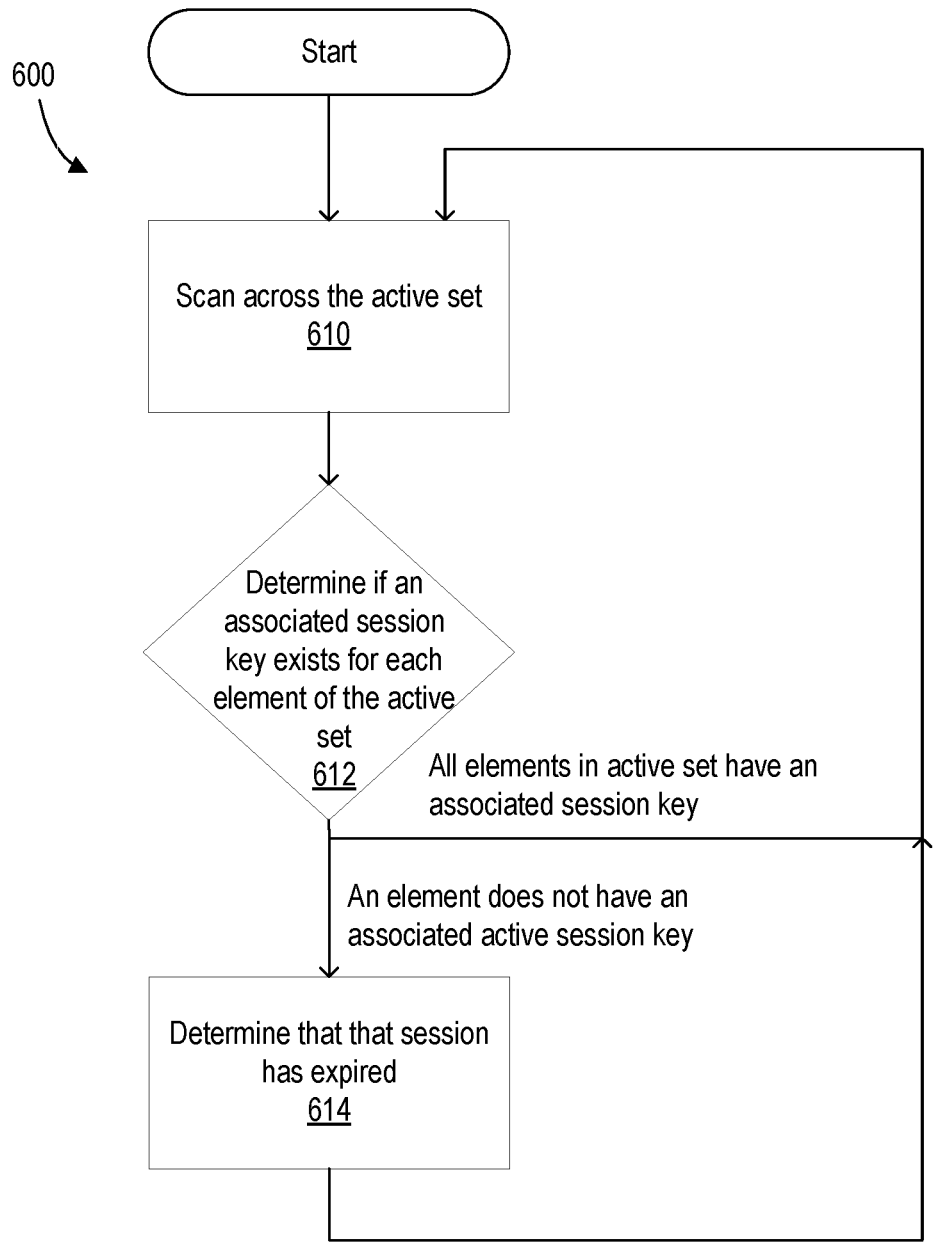
FIG. 6 illustrates an example method for a session expiry detection protocol.

FIG. 6 illustrates an example process 600 of the session expiry detection protocol. The example process 600 represents one possible implementation by which a session expiration can be detected in operation 512 of FIG. 5, above. The session expiry detection protocol 600 detects when a session expires due to, for example, a node failure. The process 600 can leverage behavior of session keys 248. A session key 248 can be a randomly generated value that is associated with each session 240 within the cluster 210. The session key 248 can expire at regular intervals and each session 240 can be responsible for maintaining and updating the session key 248. If a session key 248 has expired, the session key 248 will not be updated for a certain time interval. This failure to update can indicate that an associated session 240 has expired. This is one way of determining if a session 240 has expired. Other ways are also possible, such as by failing to detect a heartbeat message provided by a session 240 for a particular period of time. Expiration of a session 240 can be caused due to many reasons, including node failure. Each session 240 within the cluster 210 can dedicate a thread to evaluate if any of the sessions 240 within the cluster 210 encountered node failure or otherwise expired. The process 600 can begin with operation 610.

Operation 610 includes scanning across the active set. This operation 610 can include the session thread continually scanning across the active set 270. The active set 270 includes a grouping of one or more sessions 240 that are currently executing tasks. While performing the scanning across the active set 270, operation 612 can be performed on each of the elements within the active set 270. The elements can be, for example, session identifiers 242 of the sessions 240 that are part of the active set 270.

Operation 612 includes, for each respective element (e.g., the element being scanned) of the active set 270, determining if there is a session key 248 associated with the respective element that exists and is active. For each respective element of the active set, this can be performed by verifying that a session key 248 is associated with the respective element and, if so, determining if the session key 248 has been updated within a predetermined time period (e.g., so as to indicate that the session 240 has not expired).

If all elements in the active set 270 have an associated session key, then the flow of the process 600 returns to operation 610 to continue scanning across the active set. If an element does not have an associated session key, then the flow of the process 600 can move to operation 614.

Operation 614 includes determining that the session 240 corresponding to the respective element of the active set 270 expired.

Figure 7:
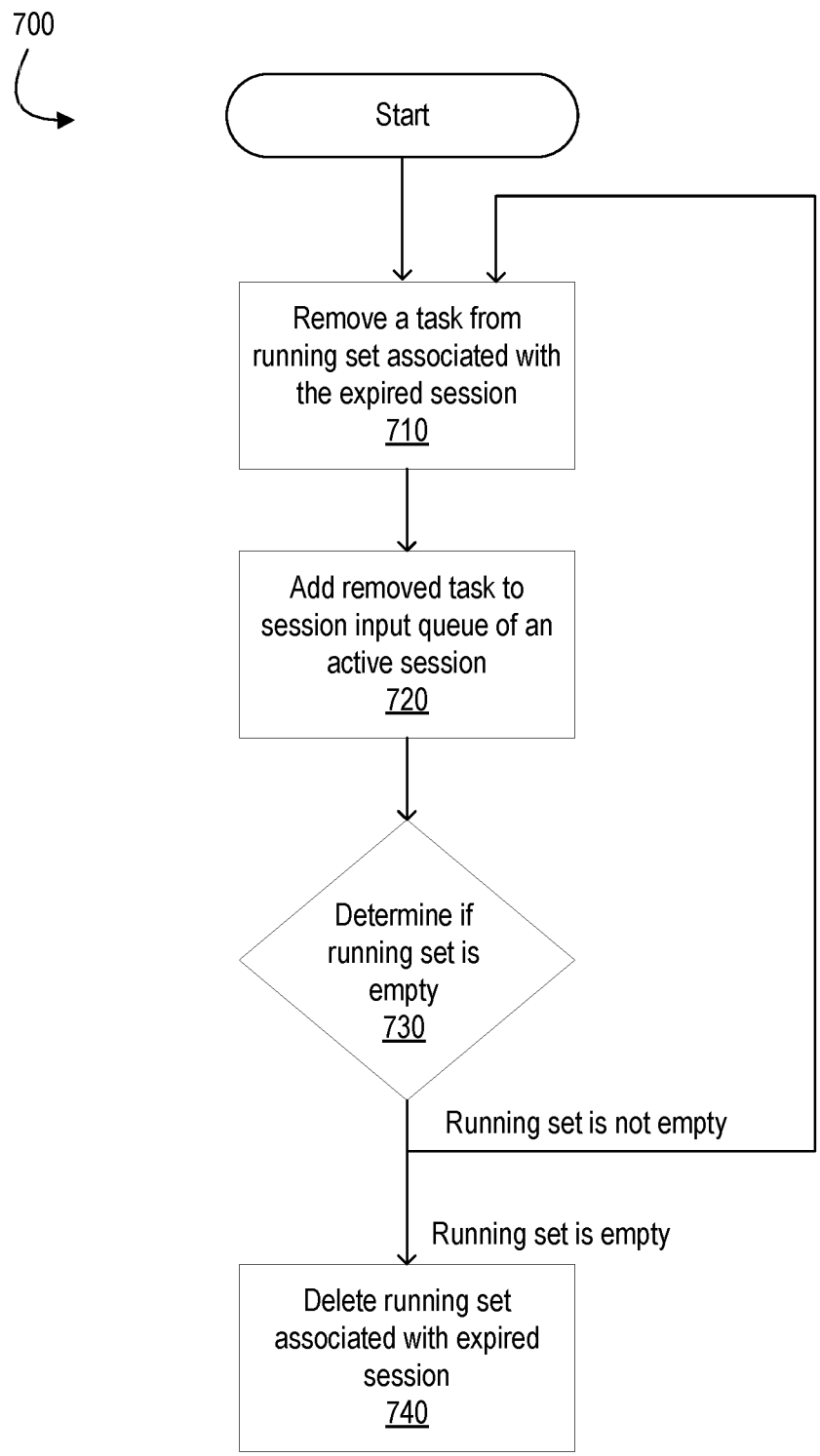
FIG. 7 illustrates an example method for maintaining a running set associated with an expired session.

FIG. 7 illustrates an example process 700 for maintaining the running set 330 associated with an expired session, such as is described in relation to operation 522 of FIG. 5. For example, the running set 330 is maintained as part of the cluster session expiry protocol 400. The process 700 beings with operation 710.

Operation 710 includes removing a task from the running set 330 associated with the expired session 710. In one example, removing a task can include deleting an associated task identifier from the running set 330. In another example, removing a task can include calling a function associated with the running set 330 that removes the task identifier entry. Following operation 710, the flow of the process 700 can move to operation 720.

Operation 720 includes adding the removed task to the session input queue of an active session. In an example embodiment, when the expiry of a session 240 is detected by a current session 240 (e.g., a session 240 other than the session that expired), the removed task can be added to the session input queue of the current session. Following operation 720, the flow of the process 700 can move to operation 730.

Operation 730 includes determining if the running set 330 is empty or if the running set 330 contains additional tasks. If the running set 330 is not empty, the flow of process 700 returns to operation 710 and continues removing tasks, (e.g., one at a time). If operation 730 determines that the running set 330 is empty, then flow of the process 700 can move to operation 740.

Operation 740 includes deleting (e.g., ceasing to maintain) the running set 330 associated with the expired session.

Figure 8:
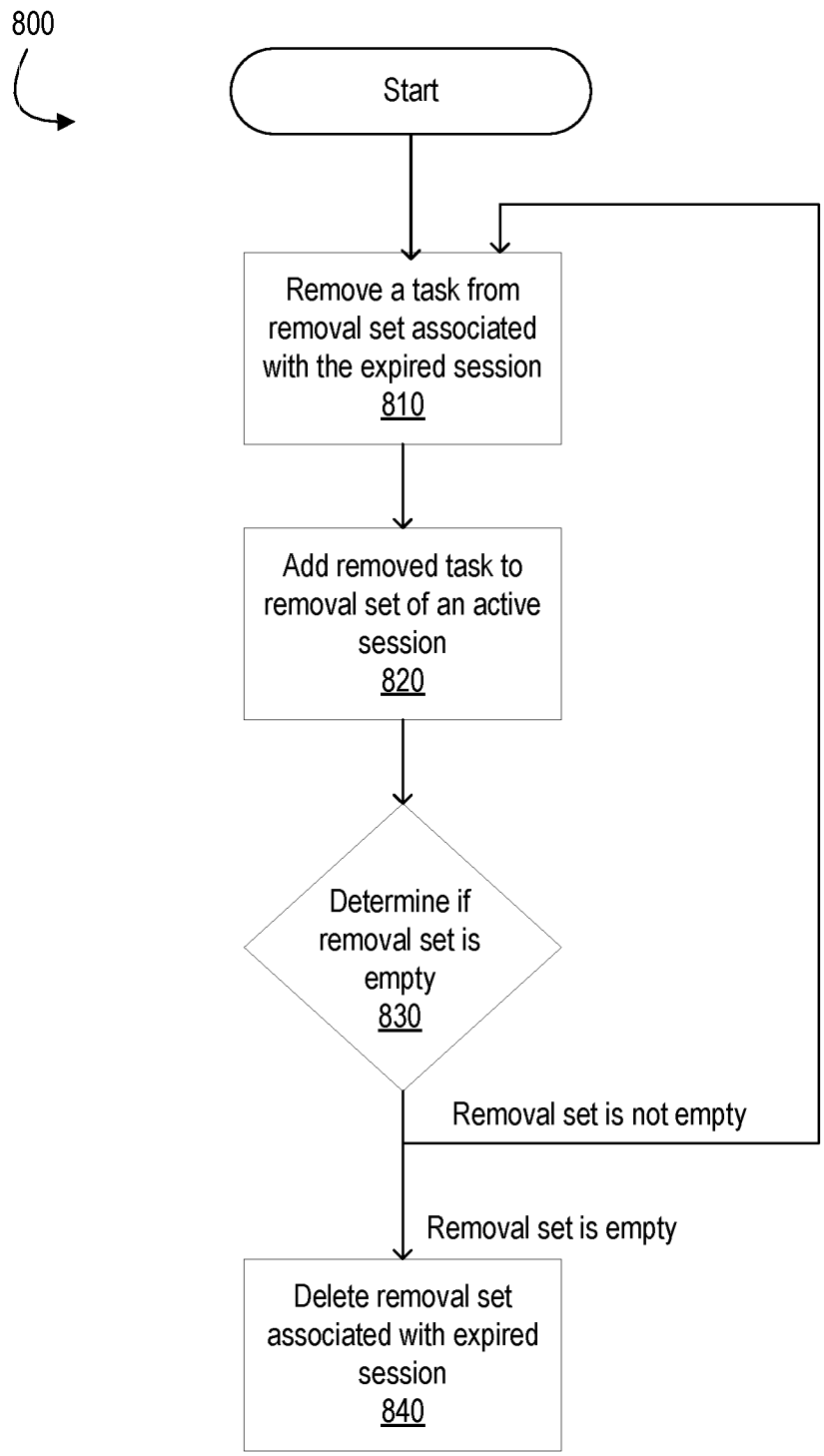
FIG. 8 illustrates an example method for maintaining a removal set associated with an expired session.

FIG. 8 illustrates an example process 800 of a method of maintaining the removal set 340 associated with an expired session, such as is described in operation 320. For example, the removal set 340 is maintained as part of the cluster session expiry protocol 300. The process 800 can begin with operation 810.

Operation 810 includes removing a task from the removal set 340 associated with the expired session. In an example, removing a task can include deleting the task identifier from the removal set 340. In another example, removing a task can include calling a function associated with the removal set 340 that removes the task identifier entry. Following operation 810, the flow of the process 800 can move to operation 820.

Operation 820 includes adding the removed task to the removal set 340 of an active session. In an example embodiment, when the expiry of a session 240 is detected by another session 240, the removed task is added to the removal set 340 of the current session. In one example, the removed task is added to the removal set 340 of the current session 240 by deleting the task identifier from the removal set 340 associated with the expired session 240 and the removed task is then added to the removal set 340 of the current session. In another example, this is accomplished by calling a separate function to do the same. Following operation 820, the flow of the process 800 can move to operation 830.

Operation 830 includes determining if the removal set 340 is empty or if the removal set 340 contains additional tasks. Following operation 830, if the removal set 340 is not empty, the flow of the process returns to operation 810 to continue removing tasks (e.g., one at a time) and adding tasks to the removal set 340 of the active session, which could include the current session, until the removal set 340 is empty. Following operation 830, if the removal set 340 is empty, then the flow of the process 800 can move to operation 840.

Operation 840 includes deleting the removal set 340 associated with the expired session. In one example, deleting the removal set 340 can include deleting the removal session 240 itself after verifying that the removal set 340 does not include any elements.

Figure 9:
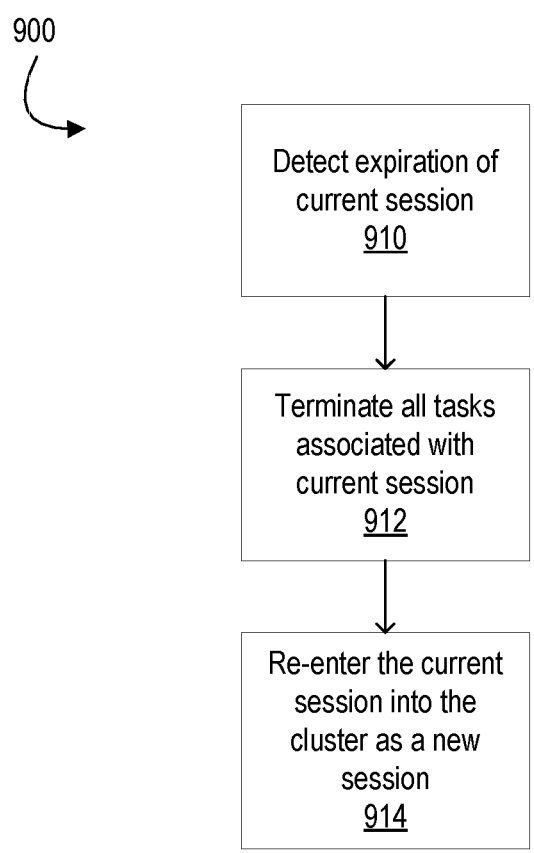
FIG. 9 illustrates an example method for a cluster session expiry protocol when a session detects its own expiration.

FIG. 9 illustrates an example process 900 of a cluster session expiry protocol when a session 240 detects its own expiration. One example situation of when a session 240 can detect its own expiration includes if there was a network partition that has resolved itself. The process 900 can begin with operation 910.

Operation 910 includes a session 240 detecting the expiration of itself. In one example, operation 910 can include using the same process as the process described in relation to FIG. 6, except the session thread fails to detect the existence its own session key when scanning the active set. Once the session 240 has expired, the corresponding node manager 260 is also ejected from the cluster 210. In one example, the association between the node manager 260 and the cluster 210 is severed by deleting any parameters in the node manager 260 that make the association. Following operation 910, the flow of the process 900 can move to operation 912.

Operation 912 includes the session 240 terminating all tasks that are associated with the session 240. Terminating all tasks can be performed using a similar technique described above in relation to FIGS. 7 and 8. The session 240 can also kill all running tasks and relaunch the associated node manager 260 as a way to terminate the tasks. Once the tasks associated with the session 240 are terminated, the flow of the process 900 moves to operation 914.

Operation 914 includes the session 240 re-entering into the cluster 210 as a new session 240. A session 240 can re-enter the cluster 210 as a new session 240 by adding a session identifier 242 into the active set 270 of the cluster 210 and accepting tasks (e.g., into an input queue).

Figure 10:
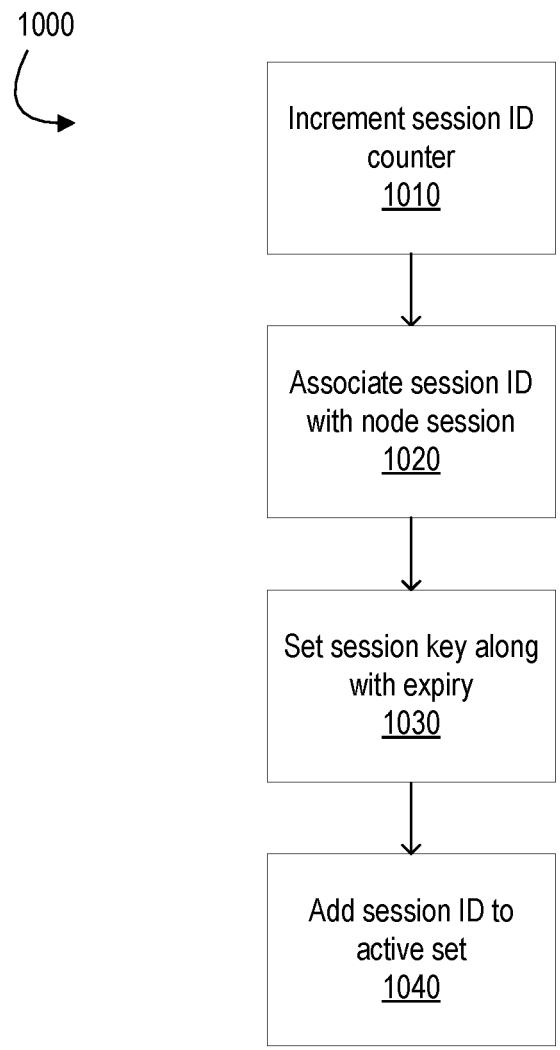
FIG. 10 illustrates an example method for a cluster join protocol.

FIG. 10 illustrates an example process 1000 for a cluster join protocol. The cluster join protocol is associated with a node session 240 joining a cluster 210 and starting to accept tasks. The process 1000 can begin with operation 1010.

Operation 1010 includes incrementing the session identifier counter. When a node joins a cluster 210, the node session 240 can initially be assigned a session identifier 242 and a session key. At the beginning of operation 1000, the session identifier counter 250 is incremented (e.g., by adding one) to arrive at the session identifier 242 that is to be assigned to the new node session. Following operation 1010, the flow of the process 1000 can move to operation 1020.

Operation 1020 includes associating the session identifier 242 with the node session. In one example, the new session identifier 242 arrived and the session identifier counter is assigned as the session identifier 242 of the session running on the new node. Following operation 1020, the flow of the process 1000 can move to operation 1030.

Operation 1030 includes setting the session key along with the expiry information. In one example, setting a session key includes creating a session key and setting a time expiration window associated with the session key. Once the session key is set, the node can become responsible for maintaining the session key. Maintaining a session key can include updating one or more parameters associated with the session key at regular intervals of time, wherein the intervals of time are within the time expiration window that was initially set. If the session key is not maintained within the time expiration window that was set, such lack of maintenance can signal to the cluster 210 that the node expired and node expiration protocol can be initiated. After completing any session key maintenance proceedings, the session key time expiration window is reset, thus beginning the time expiration window again. Following operation 1030, the flow of the process 1000 can move to operation 1040.

Operation 1040 includes adding the session identifier 242 to the active set. In one example, adding the session identifier 242 to the active set 270 can include pushing the newly created session identifier 242 into the stack of session identifiers that is maintained by the active set 270 associated with the cluster 210. Completing operation 1040 completes the cluster join protocol and the new node session 240 becomes part of the cluster 210, ready to receive tasks from the cluster 210.

Figure 11:
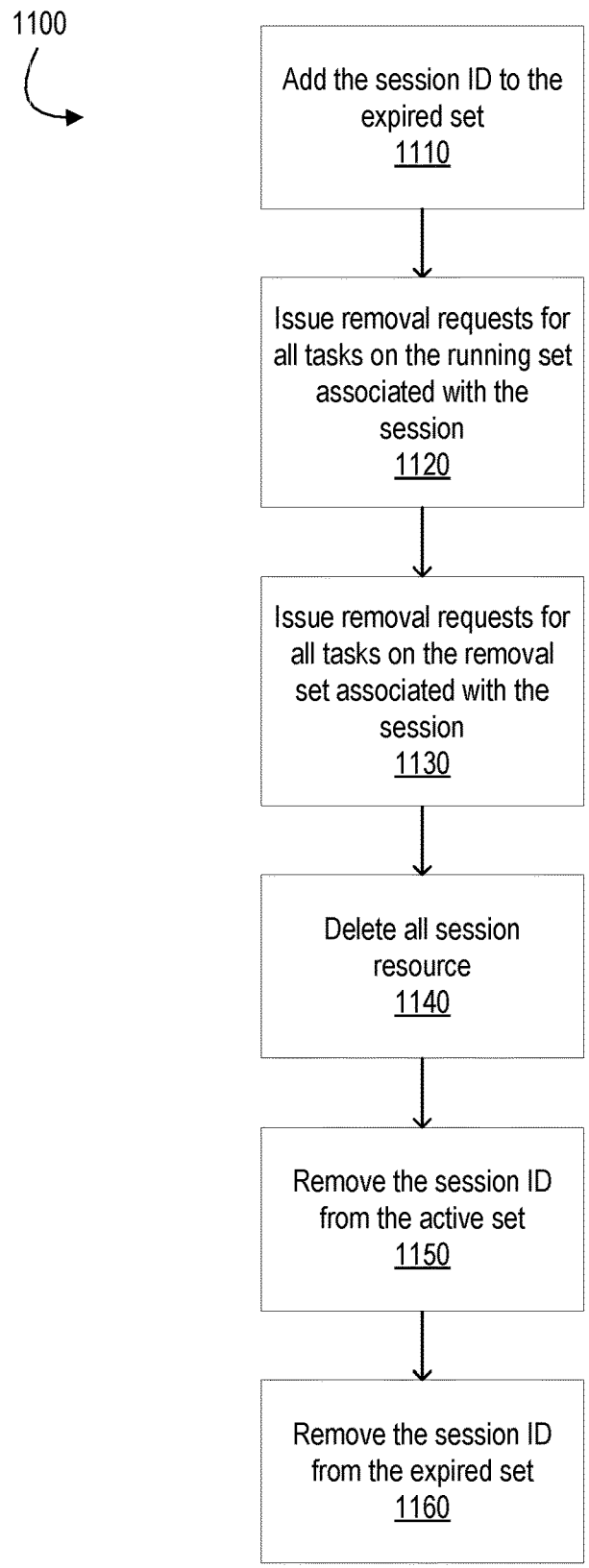
FIG. 11 illustrates an example method for a cluster exit protocol.

FIG. 11 illustrates an example process 1100 for the cluster exit protocol. The cluster exit protocol includes the process by which a node session 240 is removed from the cluster 210 and no longer accepts tasks from the cluster 210. The process 1100 can begin with operation 1110.

Operation 1110 includes adding the session identifier 242 of the node session that wants to exit the cluster 210 to the expired set of the cluster. In one example, a session identifier 242 is removed from the expired set by deleting the session identifier 242 from the expired set. Following operation 1110, the process 1100 can move to operations 1120 and 1130. Operations 1120 and 1130 can be run in parallel or sequentially in any order.

Operation 1120 includes issuing removal requests for all tasks on the running set that are associated with the expired session. Operation 1130 includes issuing removal requests for all tasks on the removal set 340 associated with the expired session. In an example, issuing a removal request can include sending a request to the expired session to run a process to stop all tasks that are currently running on the node session 240 (for removal requests associated with the running set) and to delete all task identifiers that are included in the running set after the task associated with each task identifier has stopped running. The stopping and deleting can be performed iteratively. In another example, issuing a removal request also includes successfully reassigning the tasks that were running on or set to be removed from the expired set. Once a task is removed from the running set, the task reenters the cluster input queue and is reassigned to another node session. This can be similar to how any task in the cluster input queue is assigned. The tasks removed from the removal set 340 can be added to the removal set 340 of another node session 240 or deleted. In an example, a task removed from a node session 240 can be added to the removal set 340 of the node session 240 that determined that the node session expired. In another example, the task identifiers of the tasks in the removal set 340 of an expired session 240 can be deleted iteratively until the removal set 340 is empty. Following operations 1120 and 1130, the process 1100 can move to operation 1140.

Operation 1140 includes deleting all resources associated with the expired session 240. In one example, computing resources that were being used by the expired session 240 are identified, work associated with the expired session 240 that was managed by the computing resources is stopped, and all parameters associating the computing resource to the expired session 240 are deleted or reset. Following operation 1140, the process 1100 can move to operations 1150 and 1160.

Operation 1150 includes removing the session identifier 242 from the active set. Operation 1160 includes removing the session identifier 242 from the expired set. In an example, removing the session identifier 242 from the active set 270 and expired set includes deleting the session identifier 242 from the active set 270 and expired set. Upon completing the operations 1150, 1160, the node session 240 successfully exits from the cluster.

In addition to protocols for a node to join and exit a cluster 210, other commonly used protocols for managing nodes within a cluster 210 include a cluster info protocol and a request submission protocol. The cluster info protocol is a request for information regarding the tasks that are currently being run within the cluster 210. The relevant information can be retrieved by performing a union on all the running sets associated with all the currently active sessions and publishing the information for the requester. In an example, the relevant information can include the name of the task, the task identifier associated with the task, the session identifier 242 of the session 240 where the task was running, the time at which the task was started, the description of the task, the computing resources being used for managing the task, the estimated time of completion for the task, etc. In another example, such information can be published in the form of a report with a predetermined format that is published to the requester on a user interface, or sent to the requester using email, instant messaging or some other form of communication.

Figure 12:
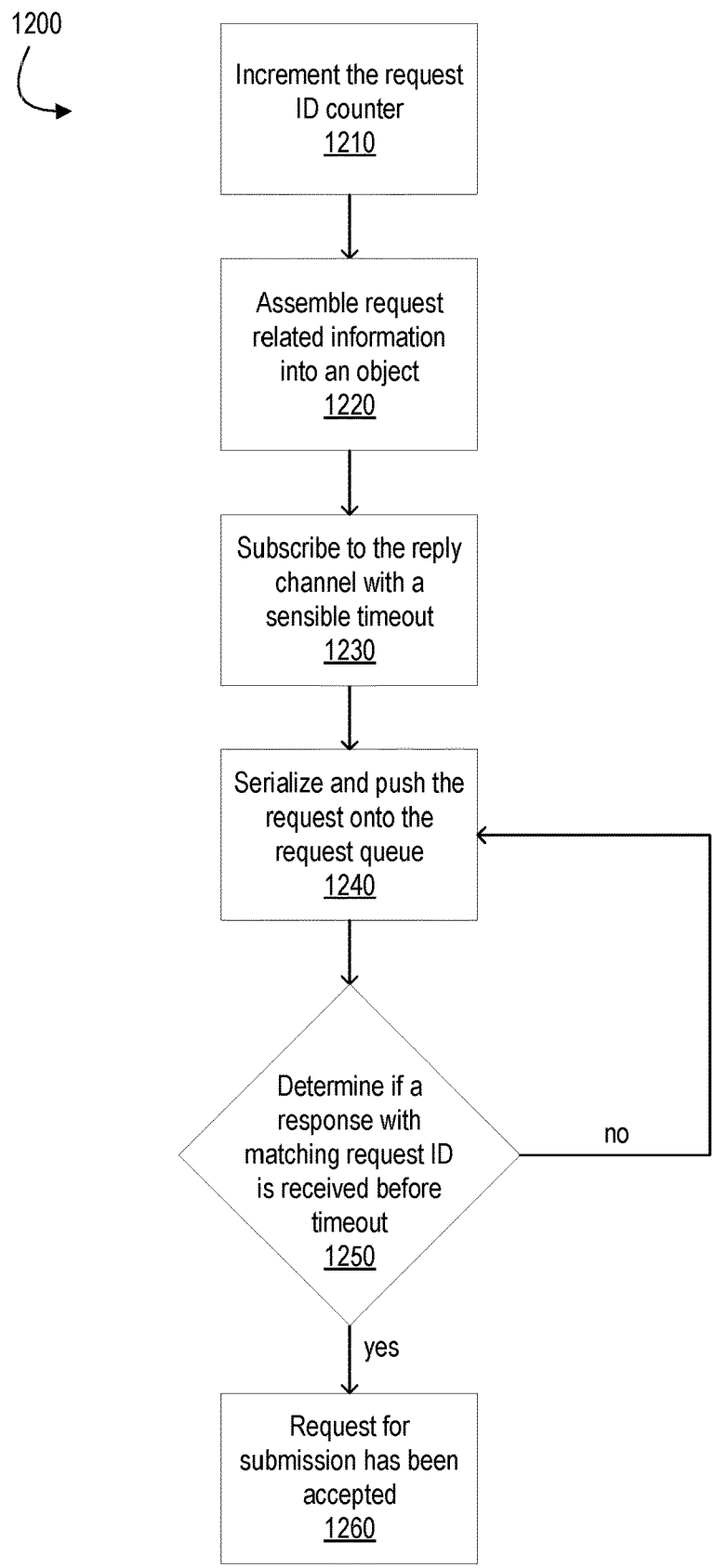
FIG. 12 illustrates an example method for a request submission protocol.

FIG. 12 illustrates an example process 1200 for the request submission protocol. The request submission protocol is a protocol used to request the submission of a task into the cluster 210. The process 1200 can begin with operation 1210.

Operation 1210 includes incrementing the request identifier counter. In one example, the request identifier counter is incremented by one in order to arrive at the new request identifier that will be associated with the newly submitted request. The request identifier can help identify the requests that are submitted. Following operation 1210, the flow of the process 1200 can move to operation 1220.

Operation 1220 includes assembling request-related information into an object. In one example, the request-related information can include: the request type, the request identifier associated with the request, the action to be taken, the one or more tasks associated with the request, the task identifiers associated with each task associated with the request, the input parameters associated with the request, the time at which the request was submitted, other information, or combinations thereof. In another example, the request related information is combined to create a data-interchange object that uses, for example, key/value pairs. For example, the object can be prepared as a JSON (JavaScript Object Notation) object. In yet another example, a different type of object can be used to assemble the request related information. Following operation 1220, the process 1200 can move to operation 1230.

Operation 1230 includes subscribing to the reply channel with a timeout. Following operation 1230, the process 1200 can move to operation 1240. Operation 1240 includes serializing and pushing the request onto the request queue. In one example, serializing and pushing the request includes converting multiple requests as they are made into a stream of requests such that the requests are added to the request queue one after another in a first in, first added manner. Following operation 1240, the process 1200 moves to operation 1250. Operation 1250 includes determining if a response with matching request identifier is received before the timeout period set during operation 1230. In one example, the application waits and monitors for a response. If a response with a matching request identifier is received before timeout, the process moves to operation 1260, which includes determining that the request for submission has been accepted. If no response is received before timeout, the application can attempt to resubmit the request again by repeating operation 1240.

Figure 13:
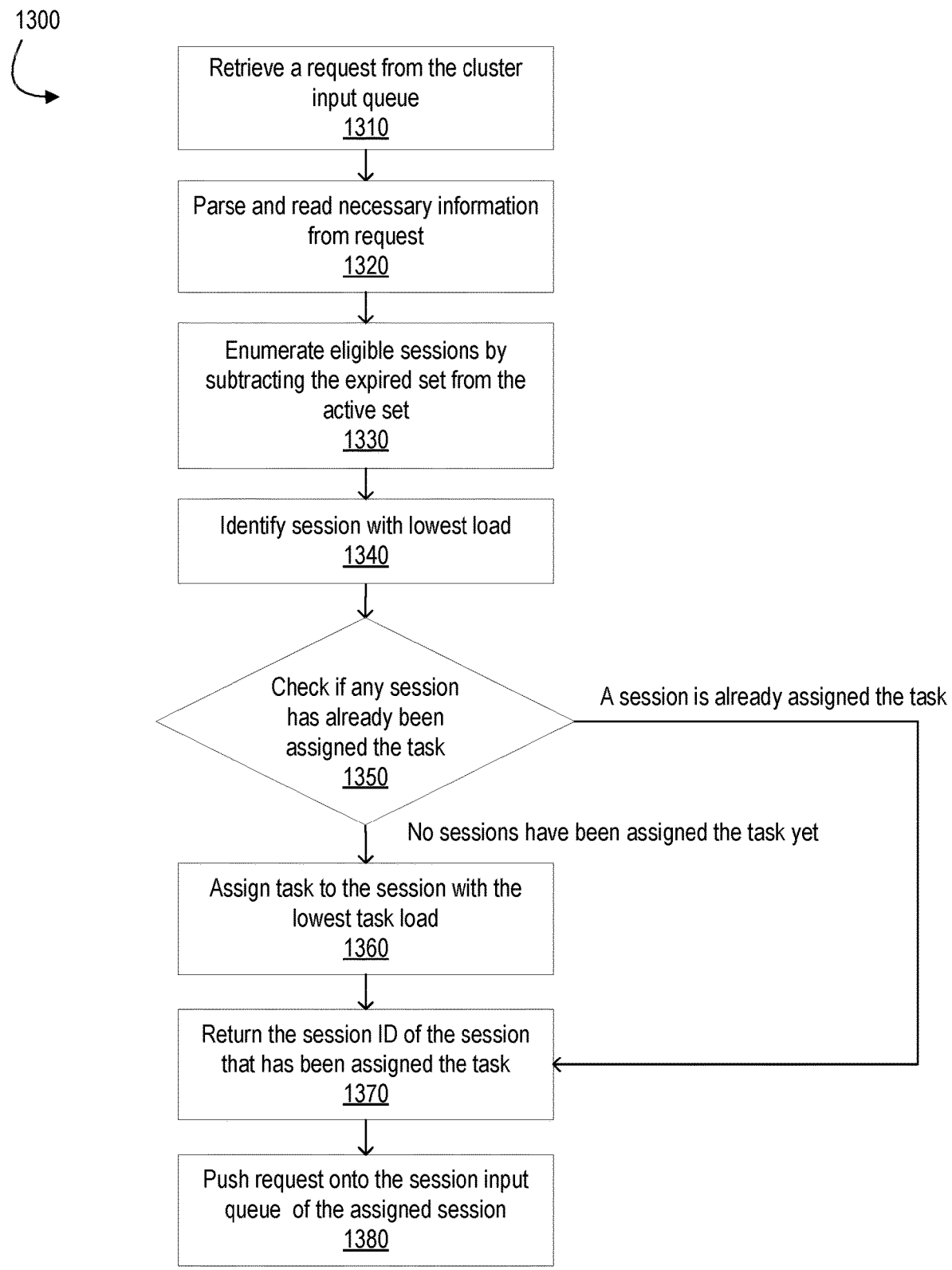
FIG. 13 illustrates an example method for a cluster add protocol.

FIG. 13 illustrates an example process 1300 for the cluster add protocol. The cluster add protocol covers retrieving a request from the input queue and adding it to the input queue of a session 240 that has the availability and capacity to run the task. Process 1300 begins with operation 1310. Operation 1310 includes retrieving a request from the cluster input queue. In one example, if the session 240 expires while holding the request in memory, the request will eventually time out and be re-issued. Following operation 1310, process 1300 moves to operation 1320.

Operation 1320 includes parsing information from the request. In one example, the information from the request includes the task action, the task identifier, the computing resources needed to manage the task, other information, or combinations thereof. Following operation 1320, process 1300 can move to process 1330. Operation 1330 includes enumerating eligible sessions 240 by subtracting the expired set from the active set. In one example, subtracting the expired set from the active set 270 provides a list of sessions that are available and eligible to run the requested task. Next, process 1300 can move to operation 1340.

Operation 1340 includes identifying the session 240 with the lowest load. In one example, the eligible session 240 are iteratively evaluated to identify the session 240 with the lowest task load. Adding the task request to the session 240 with the lowest task load can provide an increased chance for the requested task to run quickly. Following operation 1340, the process 1300 can move to operation 1350. Operation 1350 includes checking if any session 240 has already been assigned the task. Checking if any of the eligible sessions 240 have already been assigned the task can help avoid race cases of adding the same task. In another example, the check is done by iterating over the enumerated sessions and checking the session input queue and running queue for the task identifier. If the check reveals that a session 240 has already been assigned the task, the process 1300 skips operation 1360 and moves to operation 1370. Operation 1370 includes returning the session identifier 242 of the session 240 that has been assigned the task. If no sessions have been assigned the task yet, process 1300 moves to operation 1360. Operation 1360 includes assigning the task to the session 240 with the lowest task load 1360. If the process 1300 moves to operation 1360 after operation 1350, the process can then move to process 1370 and return the session identifier 242 of the session 240 that has been assigned the task (as previously described). In an example, a task is assigned to a session 240 by adding the task identifier to the task assignment set associated with the session. Following operation 1370, the process 1300 moves to operation 1380. Operation 1380 includes pushing the request onto the session input queue of the assigned session. In one example, pushing the request on the session input queue of the assigned session 240 includes identifying the assigned session 240 based on the session identifier 242 and adding the request identifier to the input queue of the assigned session.

The protocol described above can protect against the race cases where the same task is assigned to two sessions. In such cases, if two sessions pop two "adds" for the same task, one transaction would run before the other and in such cases, the second transaction can agree with the session 240 assignment of the first session. If there are replicas, wait to ensure that the replicas run the add protocol and agree that the task identifier has been added to the task assignment set.

If the wait fails, publish the failure and start over. The protocol does not need to wait if there are no replicas. In addition, although individual nodes may have to wait when executing a wait command, the remainder of the global cluster can continue to operate without also waiting. This can ensure that the whole cluster continues to perform efficiently without delays.

If the data structure store managing the node protocols crashes during the add protocol, the message pushing the request onto the session input queue of the assigned session will either receive the message or not. If the assigned session 240 receives the message, the assigned session 240 tries to launch the task and publish the result by pushing the results onto the cluster output queue. If the publish command is lost due to the data structure store crash, the application making the request runs the request again. If the assigned session 240 does not receive the message pushing the request onto the session input queue due to the crash, a failure is published and the add protocol is started over.

Figure 14:
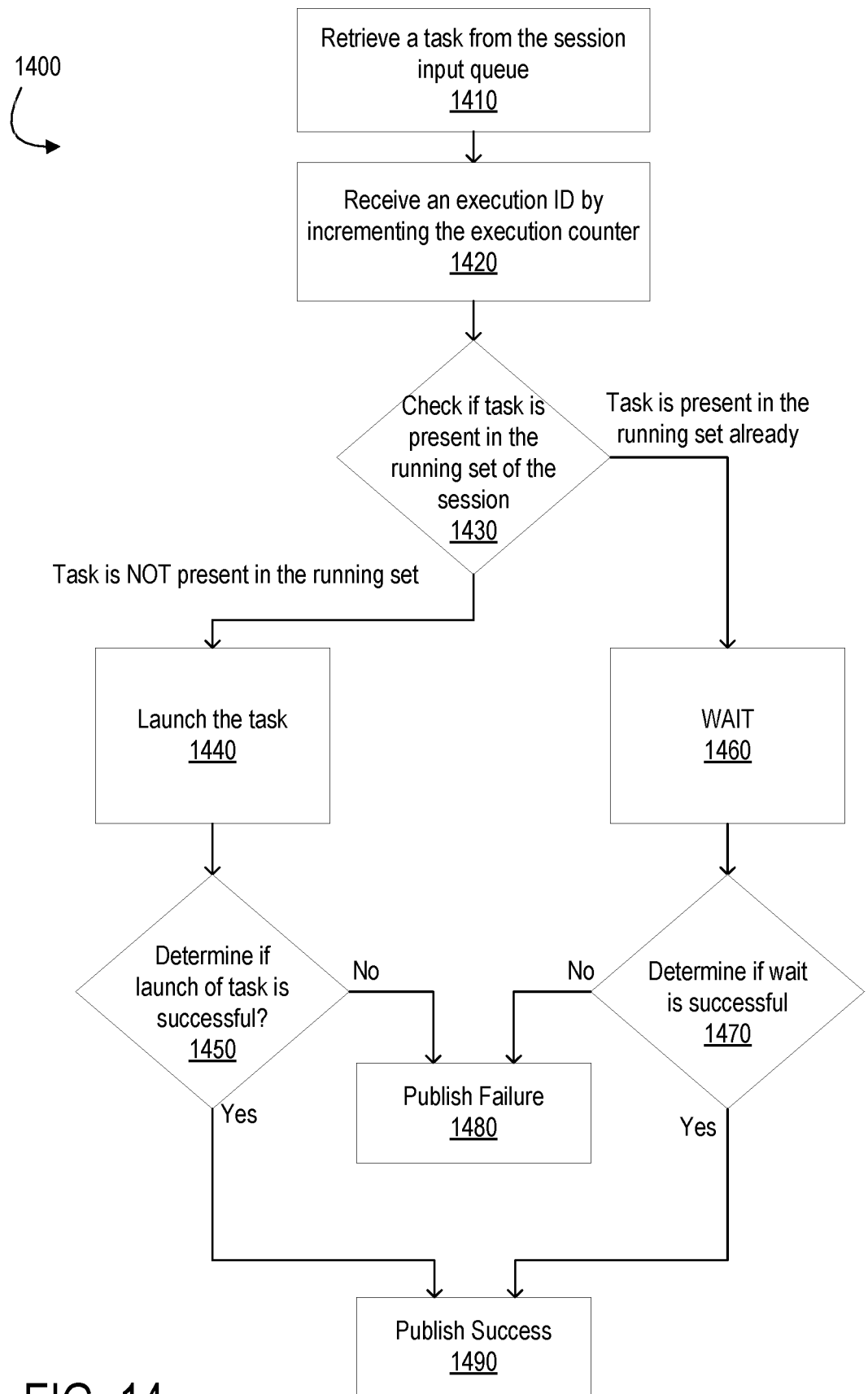
FIG. 14 illustrates an example method for a session add protocol.

FIG. 14 illustrates an example process 1400 for the session add protocol. The session add protocol can be used to add a new task to an assigned session 240 and execute the new task within the assigned session. Process 1400 can begin with operation 1410. Operation 1410 includes retrieving a new task from the session input queue. In one example, retrieving a new task can include popping a task that is on top of the session input queue. Following operation 1410, process 1400 can move to operation 1420.

Operation 1420 includes receiving an execution identifier. In one example, an execution counter 824 is incremented (e.g., by adding one) and the resulting value is the execution identifier that is received and associated with the new task that is retrieved from the session input queue. Following operation 1420, process 1400 can move to operation 1430.

Operation 1430 includes checking if the task is present in the running set of the session. In one example, checking if the task is present in the running set of the session 240 includes checking if the task identifier associated with the task is included in the grouping of task identifiers that are part of the running set that is associated with the session. The presence of the task identifier of new task on the running set associated with the session 240 indicates that the task is already running. Following operation 1430, the process 1400 can move to operation 1440 or 1460 depending on if the task is present in the running set of the session.

If the task is not already present in the running set, then that indicates that the task was not already running, and process 1400 moves to operation 1440. Operation 1440 includes launching the task. In one example, launching the task includes adding the task to the running set of the session 240 and waiting to ensure that replicas also add to their running set. If no replicas are present, no waiting is necessary. If one of the replicas disagrees with the state of the rule, a failure can be issued rather than a success even if a task is already running successfully because if the node or the underlying data structure store crashes at any point, the requester application might not be aware of the crash and thus might not issue another add request. Such a situation could result in the session's running set being left incomplete. Following operation 1440, process 1400 can move to operation 1450.

Operation 1450 includes determining if the launch of the task was successful. If the task is determined to be launched successfully, the process 1400 can move to operation 1490. Operation 1490 includes publishing the success of the task launch to the requester application. In one example, following operation 1490, the session add protocol can start over with another request. If the success message is lost during the switch over to a replica, process 1400 can wait for the requester application to make the request again.

If the task is determined to be launched unsuccessfully, the process 1400 can move to operation 1480. Operation 1480 includes publishing a failure message and attempting to add the task again. If the failure message is lost during the switch over to a replica, the requester application can interpret the loss of the message as an implicit failure and make the request again, which allows for another opportunity to either launch the task or give a reason why the task will fail.

If the task is already present in the running set, which indicates that the task is already running, then process 1400 moves to operation 1460. Operation 1460 includes waiting. In one example, waiting includes waiting to ensure that replicas of the task agree about the state of the rule. If there are no replicas, waiting is not necessary. In addition, the waiting happens locally, at the individual node and does not affect the operation of the global cluster. After waiting for a predetermined time, process 1400 can move to operation 1470 which includes determining if the waiting was successful. In one example, this can mean determining if the replicas agree. If the wait was determined to be not successful, then process 1400 moves to operation 1480. If the wait was determined to be successful, process 1400 moves to operation 1490.

Operating 1480 includes publishing failure. In one example, publishing failure includes publishing a message to the requesting application communicating that the add operation was unsuccessful and that the request should be repeated. If the success message was lost during the switch over to a replica, process 1400 can wait for the requester application to make the request again. When the requester application fails to receive a message informing of a successful add operation, the requester application can repeat the request again. Once the request is repeated, the session add protocol can be executed to try to add the new task to the session again.

Operation 1490 includes publishing the success and start executing the session add protocol on the next task on the session input queue. In one example, publishing the success includes publishing a message to the requesting application communicating that the add operation was successful.

Figure 15:
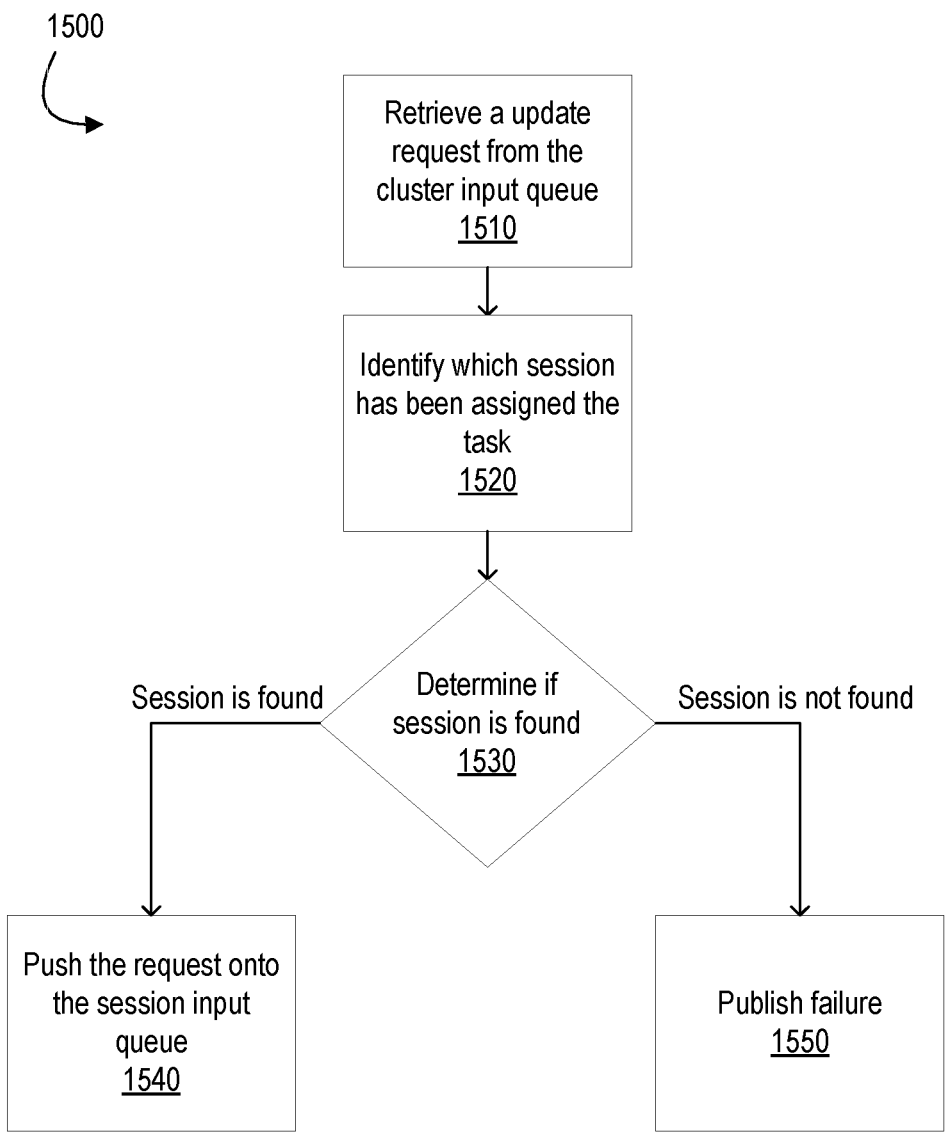
FIG. 15 illustrates an example method for a cluster update protocol.

FIG. 15 illustrates an example process 1500 for the cluster update protocol. The cluster update protocol is a protocol to update a task that has already been launched. The protocol finds and sends the update request to the appropriate session where the task is assigned. Process 1500 begins with operation 1510.

Operation 1510 includes retrieving an update request from the cluster input queue. There need not be a wait command after retrieving the update request. In one example, updates run under the assumption that the task was already assigned to a session. If a session 240 expires while holding the request in memory, the request will eventually time out and be re-issued. Following operation 1510, process 1500 can move to operation 1520.

Operation 1520 includes identifying which session 240 has been assigned the task. In one example, identifying which session 240 has been assigned the task includes scanning across task assignment sets to identify which session 240 has been assigned the task identifier of the task to be updated. If this request races with an add request, the result is effectively undefined, but the cluster 210 will end in a valid state. Following operation 1520, process 1500 can move to operation 1530.

Operation 1530 includes searching for the session 240 to which the task was assigned. If the session 240 is found, process 1500 can move to operation 1540. If the session 240 is not found, the process can move to operation 1550.

Operation 1540 includes pushing the request onto the session input queue of the session 240 where the task is assigned. In one example, if the push command is lost, the requester application will not receive a reply and the requester application will time out. If there is a time out, the requester application will resubmit the request. But even if the session 240 assignment was found, there is no guarantee that the replicas agree on the assignment. For example, a previous add request could have failed at the wait stage and the master data structure store is the only one that knows about the assignment. This can denote a logical error on the part of the requester application as the application is requesting to update a task that was not successfully added. If the replicas do not agree on the assignment, then the task cannot be in the running set of the assigned session. However, the cluster 210 will remain valid because update requests do not modify any states unless the requested task is in the running set.

Operation 1550 includes publishing failure and starting over. In one example, if the failure message is lost during the switch over to a replica, the requester application will interpret it as implicit failure and make the request again.

Figure 16:
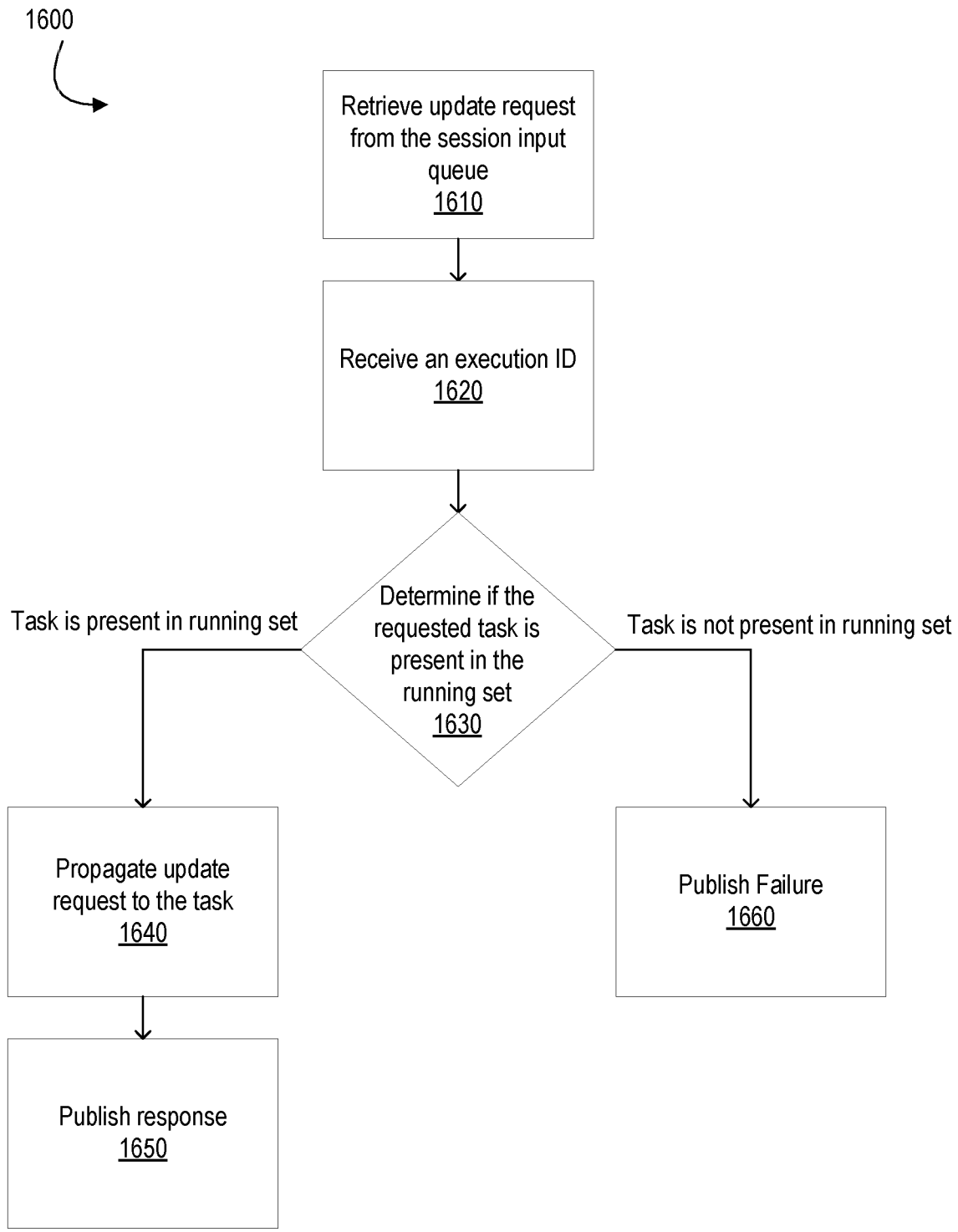
FIG. 16 illustrates an example method for a session update protocol.

FIG. 16 illustrates an example process 1600 for the session update protocol. The session update protocol updates an already added task. Process 1600 for the session update protocol begins with operation 1610. Operation 1610 includes retrieving the update request from the session input queue. In one example, retrieving the update request from the session input queue includes popping the next element off of the session input queue. Following operation 1610, process 1600 can move to operation 1620.

Operation 1620 includes receiving an execution identifier. In one example, execution identifier provides a method of inferring the execution order of requests. The execution counter 824 can be incremented (e.g., by one) and the resulting value can be the execution identifier that is associated with the new task that is retrieved from the session input queue. Following operation 1620, process 1600 can move to operation 1630. Operation 1630 includes determining if the requested task is present in the running set. In one example, operation 1630 includes scanning the running set for the task identifier of the task that is to be updated following the update request. If the task identifier of the task to be updated is present in the running set, process 1600 can move to operation 1640. If the task identifier of the task to be updated is not present in the running set, then the task was assigned to the session, but the task was not successfully launched, so the process 1600 can move to operation 1660.

Operation 1640 includes propagating the update request to the task. In one example, propagating the update request to the task includes sending the parameters associated with the update request to the task and requesting the proper parameters within the task be updated to the new value. Following operation 1640, process 1600 can move to operation 1650. Operation 1650 includes publishing the response from the task once the update request is made. In one example the response from the task can include a message indicating success or failure to update task.

Operation 1660 includes publishing failure and starting over. In one example, by requesting to update a task that was not successfully launched, the requester application made an error by asking to update a logically non-existent task. Therefore, publishing failure and starting over can be the outcome of such a request.

Figure 17:
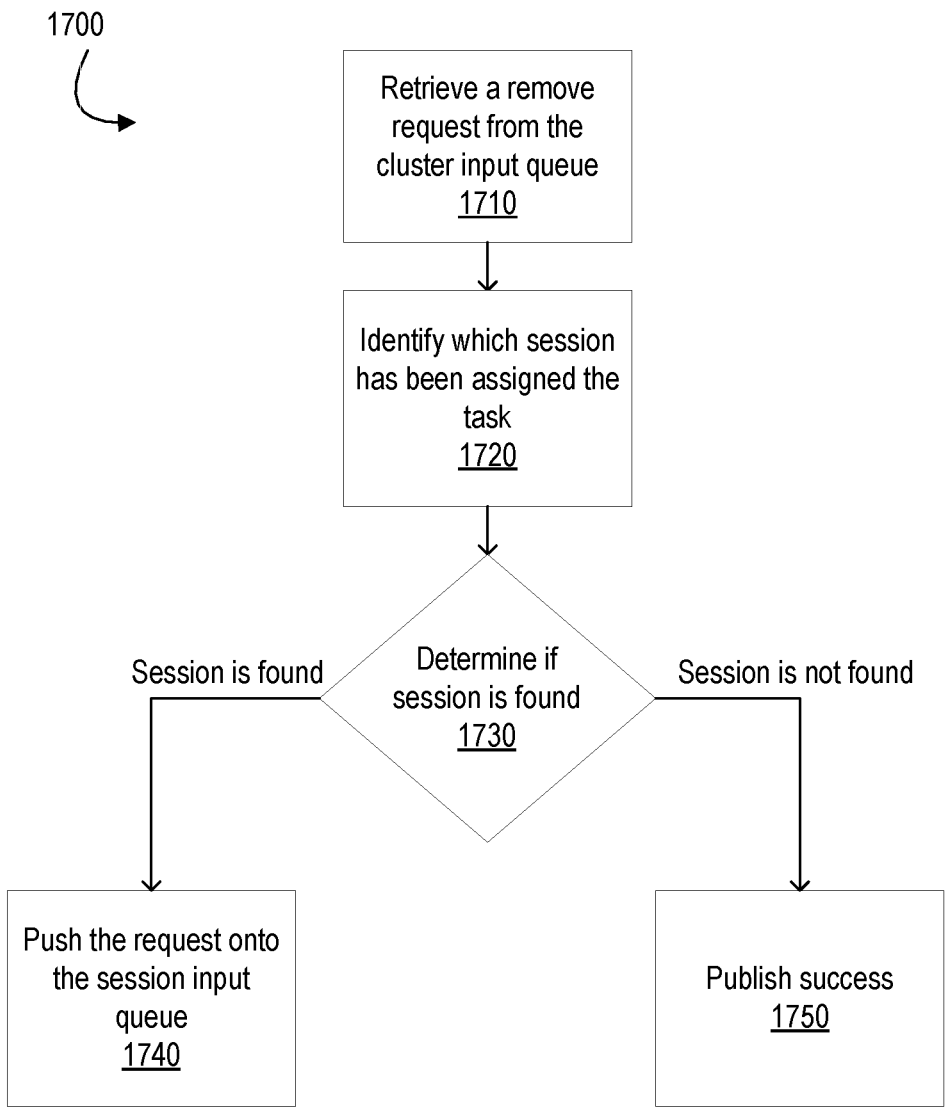
FIG. 17 illustrates an example method for a cluster remove protocol.

FIG. 17 illustrates an example process 1700 for the cluster remove protocol. The cluster remove protocol is a protocol to remove a task that has already been launched. The protocol finds and sends the remove request to the appropriate session where the task is assigned. Process 1700 can begin with operation 1710. Operation 1710 includes retrieving a remove request from the cluster input queue. In one example, retrieving the remove request from the cluster input queue includes popping the next element off of the cluster input queue. There need not be waiting after retrieving the remove request. Remove requests can run under the assumption that the task has already been assigned to a session. If a session 240 expires while holding the request in memory, the request can eventually time out and be reissued. Following operation 1710, process 1700 can move to operation 1720.

Operation 1720 includes identifying the session 240 that has been assigned the task. In one example, identifying which session 240 has been assigned the task includes scanning across task assignment sets to identify which session 240 has been assigned the task identifier of the task to be removed. If this request races with an add request, the result is effectively undefined, but the cluster will end in a valid state. Following operation 1720, process 1700 can move to operation 1730. Operation 1730 includes determining if the session 240 where the task is assigned is found. If the session 240 is found, process 1700 can move to operation 1740. If the session 240 is not found, process 1700 can move to operation 1750.

Operation 1740 includes pushing the request onto the session input queue of the session 240 where the task is assigned. In one example, if the session 240 is found, push the remove onto the session input queue of the session 240 where the task is assigned. If the push command is lost, the requester application will not receive a reply and the requester application will time out. If there is a time out, the requester application can resubmit the request. Although the session assignment was found, there is no guarantee that the replicas agree on the assignment. For example, a previous add request could have failed at the wait stage and the master data structure store is the only component that knows about the assignment. If the replicas do not agree on the assignment, then the task cannot be in the running set of the assigned session. However, the cluster can remain valid because remove requests do not modify any states unless the requested task is in the running set.

Operation 1750 includes publishing success. This decision to publish success instead of failure upon failing to find the session 240 can be counterintuitive. However, since add requests are programmed to publish success if the task is already running, it is can be beneficial for remove requests to publish success upon failing to find the session.

Figure 18:
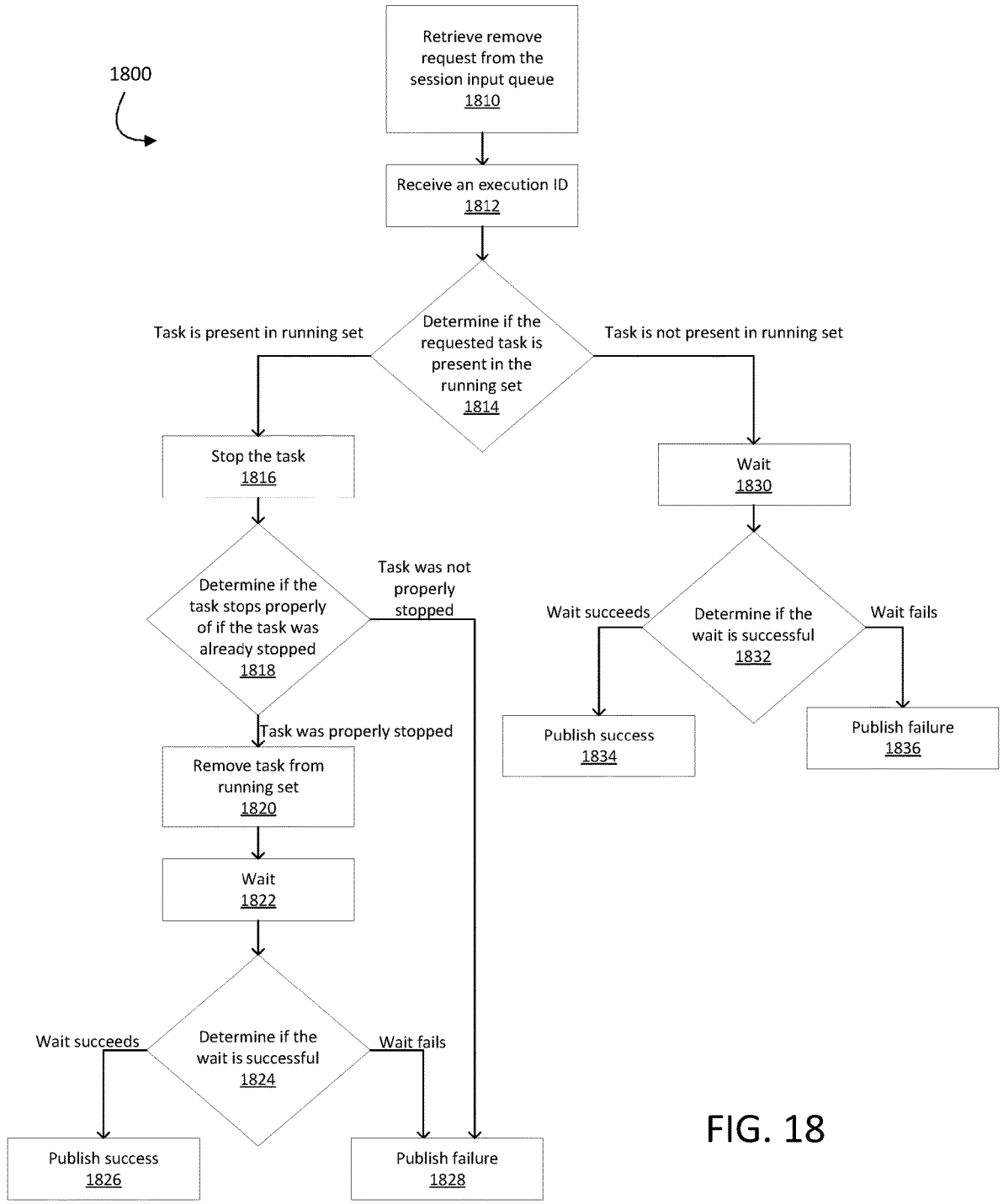
FIG. 18 illustrates an example method for a session remove protocol.

FIG. 18 illustrates an example process 1800 for the session remove protocol. The session remove protocol removes a task that has already been added to the session input queue. Process 1800 can begin with operation 1810. Operation 1810 includes retrieving the remove request from the session input queue. In one example, retrieving the remove request from the session input queue includes popping off the next element of the session input queue. Following operation 1810, process 1800 can move to operation 1812. Operation 1812 includes receiving an execution identifier. In one example, execution identifier provides a method of inferring the execution order of requests. In another example, the execution counter 824 is incremented by one and the resulting value is the execution identifier that is associated with the remove request that is retrieved from the session input queue. Following operation 1812, process 1800 can move to operation 1814.

Operation 1814 includes determining if the requested task is present in the running set that is associated with the session. In one example, operation 1814 includes scanning the running set for the task identifier of the task that is to be removed following the remove request. If the task identifier of the task to be removed is present in the running set, process 1800 can move to operation 1816. If the task identifier of the task to be updated is not present in the running set, process 1800 can move to operation 1830.

Operation 1816 includes stopping the task. In one example, after stopping the task from running further, there can be a wait to make sure that the replicas agree on the state of the rule. If there are no replicas, waiting is not necessary. In addition, the waiting happens locally, at the individual node and need not affect the operation of the global cluster. Following operation 1816, process 1800 can move to operation 1818, which includes determining if the task stopped properly or if the task was already stopped. In one example, making the determination from operation 1818 includes evaluating the results from the stop task operation 1816 and checking to see if there were messages of failure or error. Following operation 1818, if the task was properly stopped or if the task was already stopped at the time of operation 1816, process 1800 can move to operation 1820. If the task was not properly stopped, then process 1800 can skip operations 1820, 1822, 1824 and 1827 and can move to operation 1828.

Operation 1820 includes removing the task from the running set. In one example, removing a task from a running set includes deleting the task identifier associated with the task from the list of task identifiers contained in the running set. Following operation 1820, process 1800 can move to operation 1822, which includes waiting. In one example, waiting can include waiting to ensure that the replicas also remove the task from their running sets. In another example, waiting can include waiting for a predetermined amount of time before timing out. Following operation 1822, process 1800 can move to operation 1824, which includes determining if the wait was successful. In one example, a wait is considered successful if during that time the task and its replicas are deleted from the session's running set. If the wait is successful, process 1800 can move to operation 1826, which includes publishing success to the requester application. If the wait is determined to be unsuccessful due to any reason, process 1800 can move to operation 1828, which includes publishing failure and starting over. At this point, even though the task was successfully stopped and removed from the running set, if one of the replicas does not agree with the state of the rule, a fail rather than a success is published. This is to ensure that that the requester application will issue another remove request in case of a replica disagreeing with the state of the rule.

Returning to operation 1818, as discussed earlier, if the task was determined to not be properly stopped, then process 1800 can also move to operation 1828, which includes publishing failure and starting over.

Returning to operation 1814, if the task is not present in the running set, then process 1800 can move to operation 1830, which includes waiting. In one example, waiting includes waiting until a predetermined time out period is reached. Following operation 1830, process 1800 can move to operation 1832. Operation 1832 includes determining if the wait was successful. If the wait was successful, process 1800 can move to operation 1834, which publishes success and starts over. If the wait was unsuccessful, process 1800 can move to operation 1836, which includes publishing failure and starting over. In one example, waiting at operation 1830 could waste time if spurious remove requests are received. But waiting can be beneficial if a remove request is received subsequently after a previously failed wait. Waiting ensures that the replicas agree about the state of the rule before returning success to the requester application. If there are no replicas, waiting is not necessary. In addition, the waiting happens locally, at the individual node and need not affect the operation of the global cluster.

Figure 19:
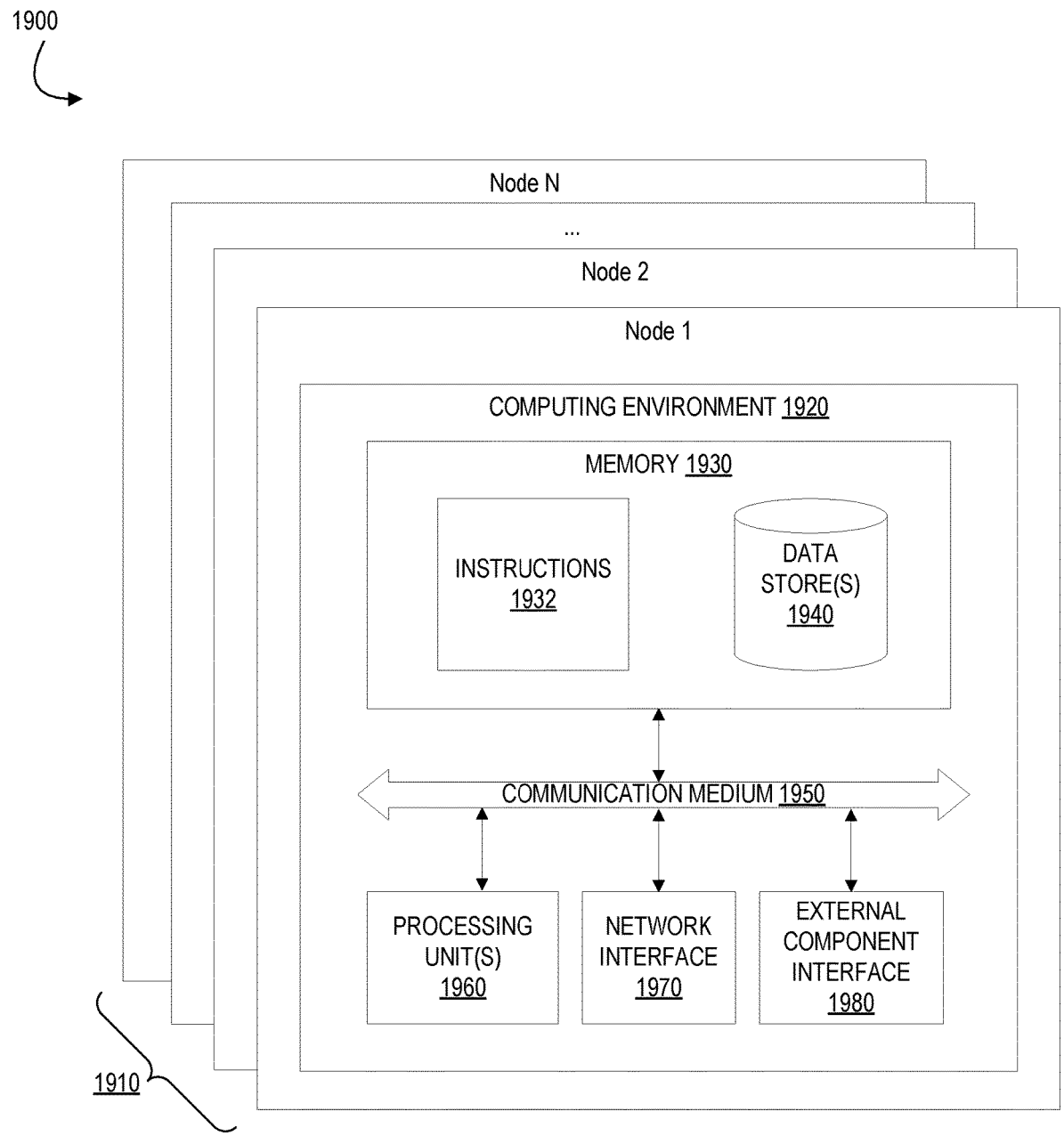
FIG. 19 illustrates an example computing system with which the disclosed systems and methods can be used.

FIG. 19 illustrates an example computing system 1900 with which disclosed systems and methods can be used. In an example, the computing system 1900 can include one or more nodes 1910 that each includes a computing environment 1920. The computing environment 1920 can be a physical computing environment, a virtualized computing environment, or a combination thereof. The computing environment 1920 can include memory 1930, a communication medium 1950, one or more processing units 1960, a network interface 1970, and an external component interface 1980.

The memory 1930 can include a computer readable storage medium. The computer storage medium can be a device or article of manufacture that stores data and/or computer-executable instructions 1932. The memory 1930 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media can include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1930 can store various types of data and software. For example, as illustrated, the memory 1930 includes instructions 1932. In some examples, the memory 1930 can include one or more data stores 1940.

The communication medium 1950 can facilitate communication among the components of the computing environment 1920. In an example, the communication medium 1950 can facilitate communication among the memory 1930, the one or more processing units 1960, the network interface 1970, and the external component interface 1980. The communications medium 1950 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1960 can include physical or virtual units that selectively execute software instructions. In an example, the one or more processing units 1960 can be physical products comprising one or more integrated circuits. The one or more processing units 1960 can be implemented as one or more processing cores. In another example, one or more processing units 1960 are implemented as one or more separate microprocessors. In yet another example embodiment, the one or more processing units 1960 can include an application-specific integrated circuit (ASIC) that provides specific functionality. In yet another example, the one or more processing units 1960 provide specific functionality by using an ASIC and by executing computer-executable instructions.

The network interface 1970 enables the computing environment 1920 to send and receive data from a communication network (e.g., network 16). The network interface 1970 can be implemented as an Ethernet interface, a token-ring network interface, a fiber optic network interface, a wireless network interface (e.g., WI-FI), or another type of network interface.

The external component interface 1980 enables the computing environment 1920 to communicate with external devices. For example, the external component interface 1980 can be a USB interface, Thunderbolt interface, a Lightning interface, a serial port interface, a parallel port interface, a PS/2 interface, and/or another type of interface that enables the computing environment 1920 to communicate with external devices. In various embodiments, the external component interface 1980 enables the computing environment 1920 to communicate with various external components, such as external storage devices, input devices, speakers, modems, media player docks, other computing devices, scanners, digital cameras, and fingerprint readers.

Although illustrated as being components of a single computing environment 1920, the components of the computing environment 1920 can be spread across multiple computing environments 1920. For example, one or more of instructions or data stored on the memory 1930 can be stored partially or entirely in a separate computing environment 1920 that is accessed over a network.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

Various embodiments are described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The invention claimed is:

1. A method for handling expiration of a session associated with processing threads, the method comprising:
   detecting expiration of an expired session, wherein detecting the expiration of the expired session includes;
      scanning each element in an active set for an associated session key; and
      responsive to failing to detect the session key associated with the expired session, determining that the expired session expired, thereby detecting the expiration of the expired session;
   responsive to detecting the expiration of the expired session, removing a session identifier associated with the expired session from the active set and adding the session identifier to an expired set;
   freeing one or more computing resources associated with the expired session;
   maintaining a running set associated with the expired session;
   maintaining a removal set associated with the expired session;
   determining whether the running set and removal set are empty; and
   responsive to determining the running set and removal set are empty, removing the session identifier associated with the expired session from the expired set, thereby handling expiration of the expired session.

2. The method of claim 1, wherein a current session detects the expiration of the expired session.

3. The method of claim 2, wherein maintaining a running set comprises:
   until the running set is empty:
      removing a task from the running set associated with the expired session; and
      adding the removed task to a session input queue associated with the current session.

4. The method of claim 2, wherein maintaining a removal set comprises:
   until the removal set is empty:
      removing a task from the removal set; and
      adding the removed task to the removal set associated with the current session.

5. The method of claim 1,
   wherein the running set associated with a session includes tasks that are currently being executed by the session.

6. The method of claim 1,
   wherein the removal set associated with a session includes tasks that are waiting to be removed from execution by the session.

7. The method of claim 1, wherein an active set includes a grouping of one or more sessions that are currently executing tasks.

8. The method of claim 1, wherein an expired set includes a grouping of one or more sessions that are no longer executing tasks.

9. The method of claim 1, wherein the active set, the expired set, the running set or the removal set is formatted as a stack or a queue.

10. A method for handling expiration of a current session belonging to a cluster of sessions, comprising:
    with the current session:
    detecting the expiration of the current session, wherein detecting the expiration of the current session includes;
       scanning each element in an active set for an associated session key; and
       responsive to failing to detect the session key associated with the current session, determining that the current session expired, thereby detecting the expiration of the current session;

responsive to detecting the expiration of the current session, removing the session identifier associated with the current session from the active set and adding the session identifier to an expired set;

freeing one or more computing resources associated with the current session;

maintaining a running set associated with the current session;

maintaining a removal set associated with the current session;

determining whether the running set and removal set are empty;

responsive to determining the running set and removal set are empty, removing the session identifier associated with the current session from the expired set, thereby handling expiration of the current session;

terminating all tasks associated with the current session; and upon completion of handling of the expiration of the current session, reentering the current session into the cluster of sessions as a new session by adding a session identifier associated with the current session to the active set.

11. The method of claim 10, wherein the current session is managed by a node manager.

12. The method of claim 11, wherein upon detecting the expiration of the current session, the node manager is ejected from the cluster of sessions.

13. The method of claim 10, further comprising:
with the current session:
maintaining a running set and a removal set.

14. The method of claim 13,
wherein the running set associated with a session is a grouping of tasks that are currently being executed by the session.

15. The method of claim 13, wherein the removal set associated with a session includes tasks that are waiting to be removed from execution by the session.

16. The method of claim 10, wherein one or both of the running set and removal set are formatted as a stack or a queue.

17. The method of claim 10, wherein the expiration of the session is caused by a network partition.

* * * * *